(12) United States Patent
Weber

(10) Patent No.: US 6,628,344 B1
(45) Date of Patent: Sep. 30, 2003

(54) REMOTE CONTROL SYSTEM PROVIDING AN AUTOMATIC ASSERTION OF A PRESET SELECTION VALUE CONCURRENT WITH A SUBMISSION OF A USER PREFERRED SELECTION VALUE

(76) Inventor: Harold J. Weber, P.O. Box 169, Barnstable County, Centerville, MA (US) 02632

(*) Notice: Subject to any disclaimer, the term of this patent is extended or adjusted under 35 U.S.C. 154(b) by 457 days.

(21) Appl. No.: 09/614,559

(22) Filed: Jul. 12, 2000

(51) Int. Cl.$^7$ ................................................ H04N 5/44
(52) U.S. Cl. ...................................................... 348/734
(58) Field of Search ................................ 348/725, 731, 348/734; H04N 5/44

(56) References Cited

U.S. PATENT DOCUMENTS

| | | | | |
|---|---|---|---|---|
| 4,837,627 A | * | 6/1989 | Mengel | 348/731 |
| 4,996,597 A | * | 2/1991 | Duffield | 348/705 |
| 5,886,847 A | * | 3/1999 | Lee et al. | 360/79 |
| 6,020,928 A | * | 2/2000 | Song | 348/564 |
| 6,078,270 A | * | 6/2000 | Shim | 340/825.72 |
| 6,094,239 A | * | 7/2000 | Weber | 348/734 |
| 6,133,910 A | * | 10/2000 | Stinebruner | 725/49 |
| 6,215,531 B1 | * | 4/2001 | Beery | 348/734 |
| 6,396,549 B1 | * | 5/2002 | Weber | 348/734 |

\* cited by examiner

*Primary Examiner*—John Miller
*Assistant Examiner*—Brian Yenke

(57) ABSTRACT

A portable remote controller for use with an accessory television device, such as a cable converter, satellite receiver, VCR, DVD player, delayed playback machine or video camera, particularly when used in conjunction with a televisor. The remote controller includes a provision for enabling a manual entry of a channel selection preference or other user determined command. User entry is usually accomplished through a finger actuated keypad submission, resulting in a command encoded wireless command signal being developed by the remote controller and sent to the controlled accessory device. As a result, the accessory device such as a cable box responds to the user's channel selection entry or other command and delivers an intermediate signal on a predetermined channel, commonly channel 3 or channel 4, that couples with the televisor. The remote controller simultaneously sends a preset value encoded wireless command signal directly to the televisor which assures that the televisor input is maintained compatible with the intermediate signal delivered on the predetermined channel by the accessory television device. For example, if the intermediate signal is delivered on channel 3, the televisor must be set to channel 3. The invention's essence is to reassert and thereby unequivocally maintain the necessitous intermediate signal compatibility between the televisor and the accessory television device every time the user submits a channel selection change or other command to the accessory television device.

22 Claims, 18 Drawing Sheets

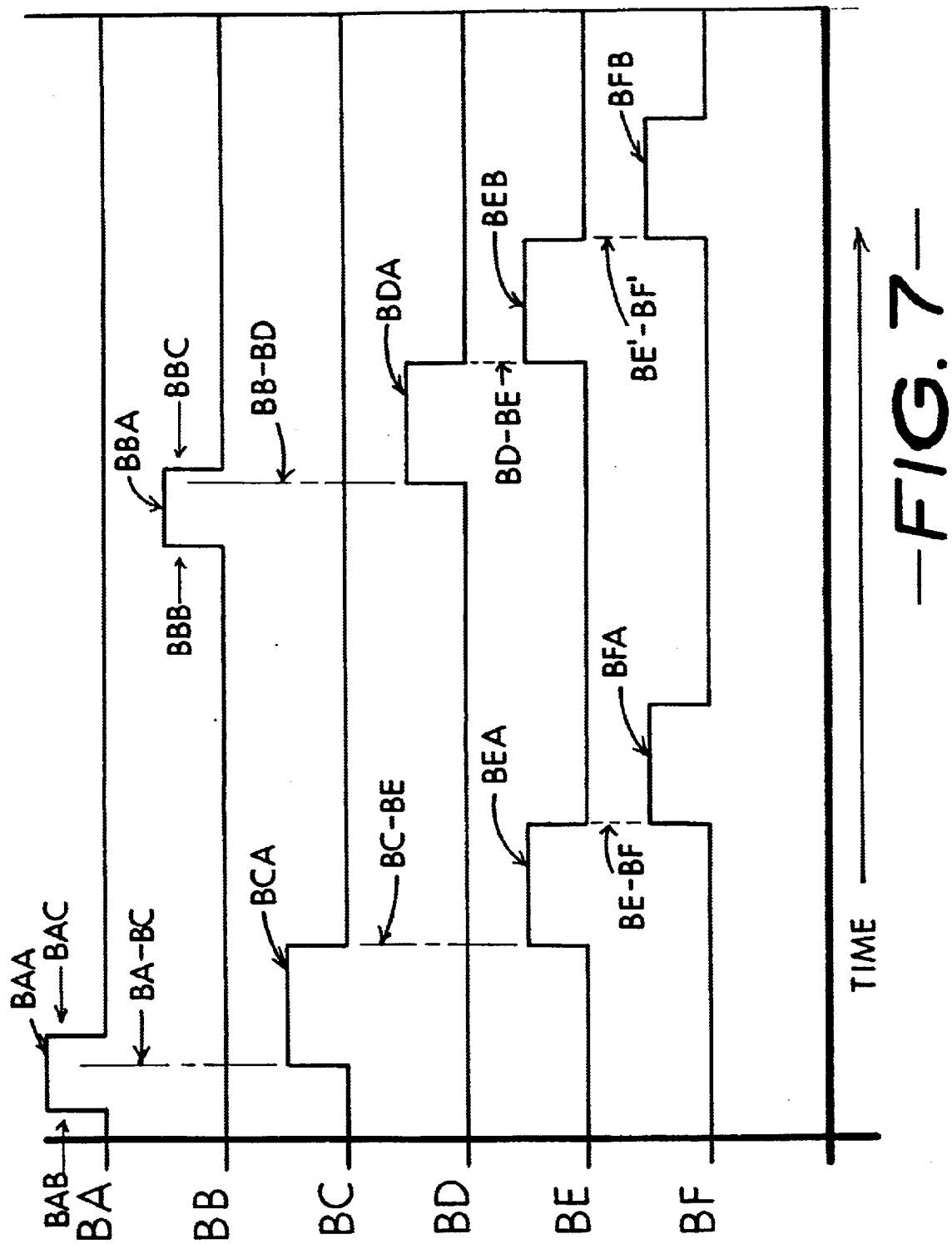

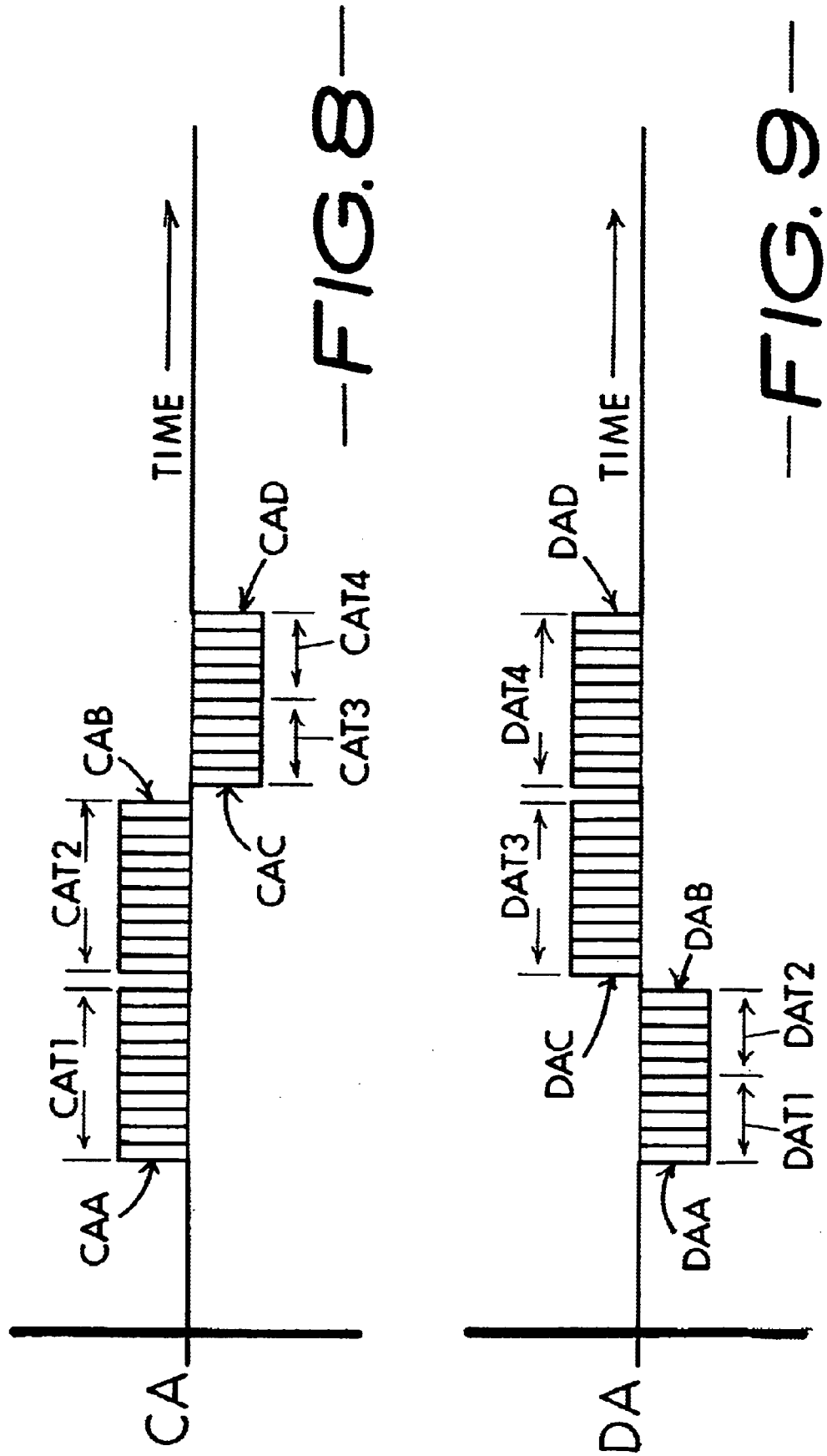

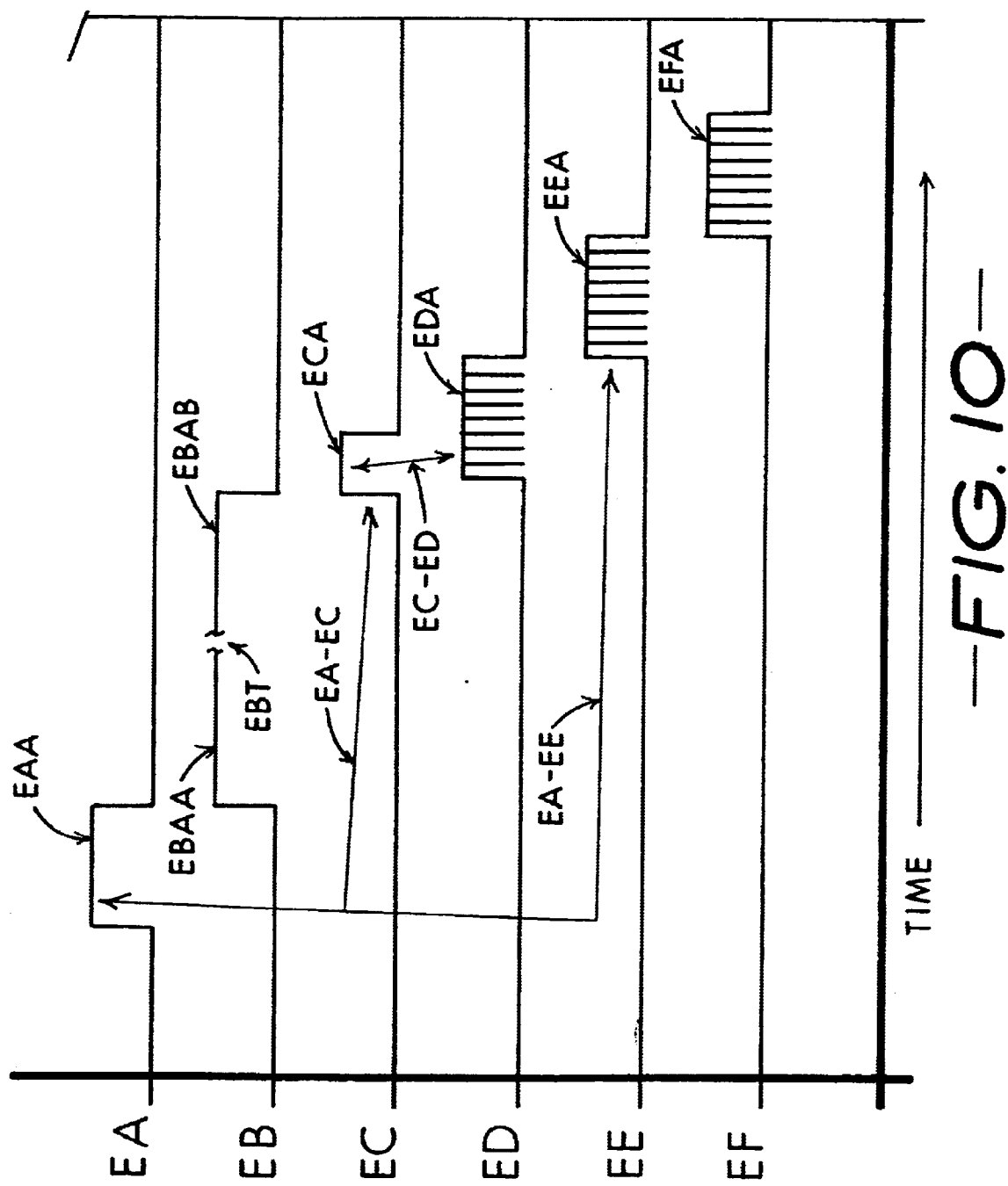

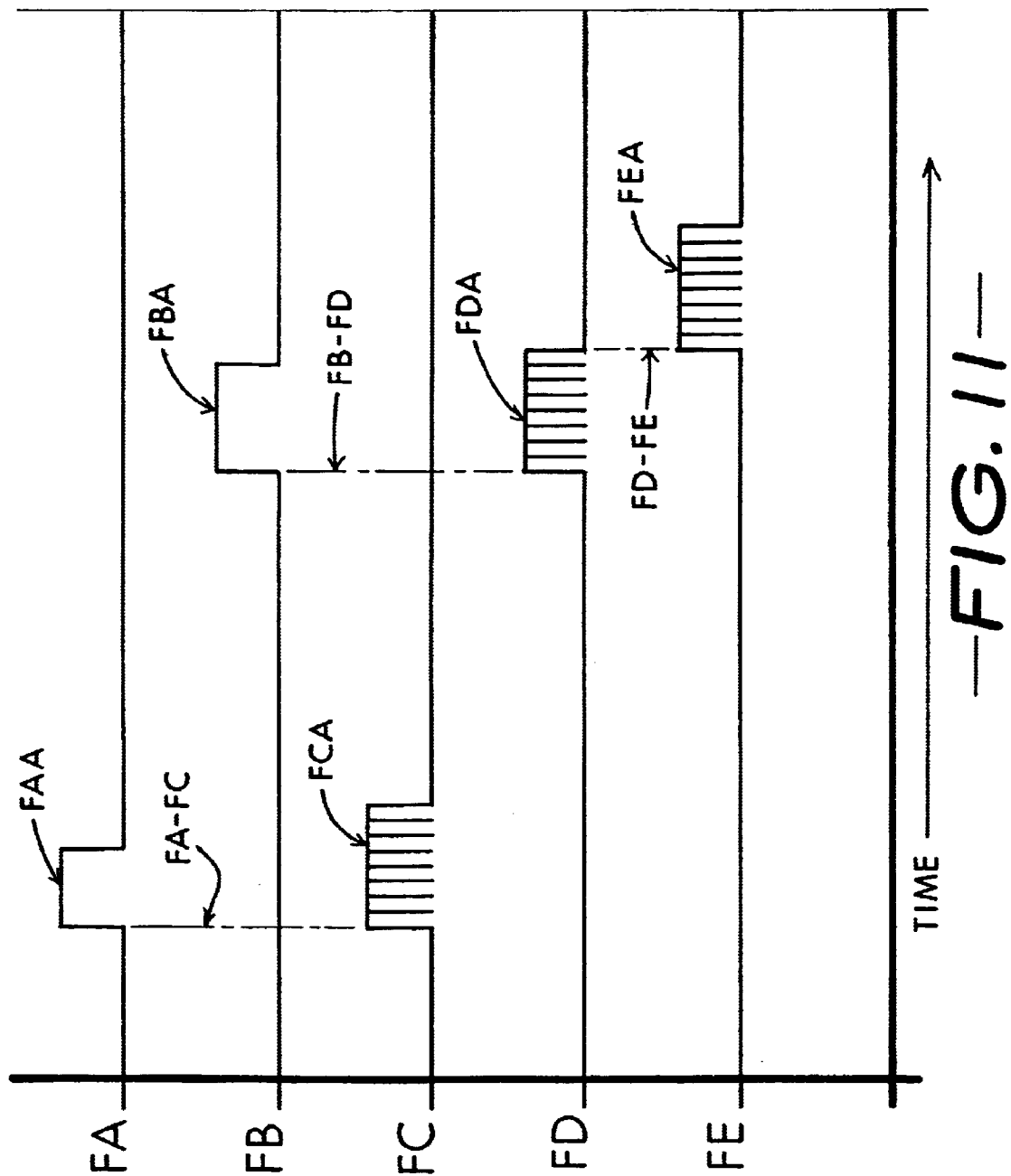

—FIG. 18—

REMOTE CONTROL SYSTEM PROVIDING AN AUTOMATIC ASSERTION OF A PRESET SELECTION VALUE CONCURRENT WITH A SUBMISSION OF A USER PREFERRED SELECTION VALUE

OVERVIEW

A hand held remote control is a commonplace appurtenance used with contemporaneous entertainment equipment, such as television sets (a televisor) and the like. In addition to immediate usage with the televisor, the hand held remote control is also counted on to enable a user (viewer) to manipulate the functions and channel selections of popular and widely used accessories coupled with the typical televisor.

It is quite common for the televisor to be connected with one or more ancillary or supplementary devices, including a video cassette recorder (VCR), a digital video disk player (DVD), a "cable converter box", a satellite signal receiver (such as "Direct TV"), a video game console, a "camcorder" or video camera and more recently even with video-delay players (hard-drive recorders) and some forms of computer interfaces, such as "Web-TV" adapters.

REAL CHANNEL SELECTIONS

Program signals are usually thought of as "off the air" signals which may be received from a broadcast station. Generally real channel assignments lay between channel 2 and about channel 69, as defined and subsequently assigned to broadcasters by the Federal Communications Commission (FCC) in accord with international treaty agreements. An example of such a signal would be a real channel 5 televison signal directly received from a television station, such as the ABC channel 5 station WCVB in Boston.

Users often utilize a video cassette recorder (VCR) as a receiving front end. This enables off-the-air recording of programs. When not recording, the tuning capability of the VCR may continue to be used to down-convert an incoming program channel to a preset, fixed channel which I refer to as the necessitous channel or interface channel setting. In commonplace VCR devices, the incoming program channels are usually real channel assignments, ordinarily picked off the air.

More recently, delayed playback devices have gained popularity in which the incoming video is temporarily recorded on a hard disk drive, similar to a computer hard drive. The stored digitized video is then replayable in part or in toto a few seconds or many hours later. Better known is the ReplayTV available as a Panasonic ShowStopper™. It's operation is similar to that of a VCR, delivering its output signal on a necessitous or interlink channel setting, such as channel 3 or channel 4.

VIRTUAL CHANNEL SELECTION

A cable system may also be a program source. Cable systems often provide their captured "off-the-air programs" on different "virtual" channels than originally assigned to the broadcaster by the FCC. For example, in a particular MediaOne™ Cable (AT&T) provider system, Boston's real channel 38 station is down-converted to a virtual channel 14 when received over the MediaOne™ cable system. For purpose of these teachings a program source may be translated through the cable system as a real or a virtual channel.

My definition of a program signal resides in a user's ability to select any one of a number of program source channels, usually found between a virtual channel 1 and virtual channel 210 in the case of a DIRECTV® satellite receiver typified by an RCA receiver Model DRD222RD. When the source is a cable-TV system such as MediaOne™, a "universal" cable converter such as a Radio Shack™ type 15-1981 may afford up to 181 virtual channel selections for the user.

A shared characteristic of satellite receivers, cable converters or VCR's used as receiving front ends is their common deliverance of an interlink, or intercoupling, signal usually confined to one of the real channels 3 or 4. In most devices, a slide switch may be preset at installation to channel 3 or else channel 4. However, it shall not be construed that my invention is restricted to systems that limit the intercoupling to channels 3 and 4. In concept, any channel to which the TV set is capable of responding may in fact be used for the interlink channel. What is important is to realize that the interlink or intercoupling channel is maintained on a necessitous assignment. Channel 3, for example. This says that the necessitous intercoupling channel 3 is maintained independent from whatever incoming program channel is selected by the user.

A CONFUSING NUMBER OF REMOTE CONTROLS

As a result of a commonplace hookup of several different remotely controllable devices in conjunction with the host televisor, the number of separate remote controls quickly becomes overwhelming. In a very typical hookup, a viewer may have the televisor coupled at least with a cable converter box and a VCR. This arrangement intrinsically implies that three different remote controls may be necessary, each with its individual keypad layout and function markings.

As a result of the need for several remote controls in a usual family's usage of the televisor, others have developed many alternative "universal" remote controls. These types of "do everything" remote controls are represented by a "Universal Remote" Model SC-330 produced by Recoton Corp., (Jensen Division), Lake Mary, Fla. A fundamental object of a classic form of "universal" type remote controller is to enable a user to access and operate several usually interconnected pieces of entertainment apparatus from a single shared-function hand-held remote control device. The essence of this type of multi-device remote controller is to provide a "switchover" or selection provision for each of the remotely controlled apparatus. For example, a typical multipurpose remote controller may have a provision for operating a TV-set, VCR and Cable Box.

In this arrangement, the cable box may be coupled to the cable system. The cable box converts an incoming program signal, say channel 57 into a viable intermediate channel 03 signal which couples with the input of the VCR. This connection enables the user to record a program for later viewing, or else to divert the channel 03 signal directly to the TV set. You will quickly realize the necessity for both the VCR and the TV-set to be assuredly set to channel 03 for this setup to work as intended. Using usual hardware configurations, which might include the following set of equipment:

| Device | Input | Output Signal |
|---|---|---|
| Cable Converter | Cable Source Channel 1–99 | Channel 03 |
| Video Cassette Recorder | Channel 03 | Channel 03 |
| Recorder | Channel 03 | or Record on Tape |
| TV Set (Televisor) | Channel 03 | Viewable Image | it quickly becomes apparent that both the VCR and the TV-Set must be maintained set to channel 03 (or alternately channel 04) in order to provide a proper transfer of the program signal received from the cable source in order to produce the viewable image for the user. You also must realize that in order to set the various devices as mentioned may require at least three distinct "codes".

Code 1 Set the cable converter to match the desired incoming program channel, usually selected between channel 01 and channel 99, such as the mentioned channel 57. Delivering the selected program at an output on a first preset channel 03.

Code 2 Set the VCR-INPUT to Channel 03 in order to accept the first interlink signal delivered from the cable converter on the preset channel 03. Delivering a second interlink signal, usually preset to channel 03.

Code 3 Set the TV-Set INPUT to channel 03 in order to be receptive to the second interlink signal delivered from the VCR-OUTPUT on the preset channel 03.

As you may correctly deduce from this scenario, three distinctively different command codes are involved in order to set the several components of this arrangement into operational harmony. More urgently, you should now see that this teaching's novelty resides in the recognition of this necessity for several concurrent commands to be made to unconditionally assure interequipment signal coupling compatibility. I expressly describe the sending of a program selection command code to the cable converter for picking a user preferred one of a number of available program channels, concurrent with the transparent sending of a channel 03 or channel 04 second selection command code for a TV-set or VCR's usage. You shall realize that this transparent sending of the channel 03 or channel 04 second selection command may be delivered in more than one code, suited for example for normalizing the VCR and the TV-set each to channel 03 concurrent with picking the user's choice of program channel (typified as between channel 01 and 99). This extension beyond merely sending one code for selecting channel 03 (or channel 04) on one apparatus, to some plurality of codes for cooperatively setting up several apparatuses is mentioned, for it is an obvious and natural extension of my invention's essence.

In the usual type of "universal" remote controller, a substantial library of the necessary command codes or "keys" is stored in a memory. These keys usually assume 3 or 4 digit number combinations, such as 1234. During initial setup or activation of the remote controller, each remotely controlled device's unique "code" combination is read from the memory and used during the activation process to define each of several encoded "beams" of light, or other wireless coupling provision, with a uniquely encoded modulation signature sensible by the intended remotely controlled device so as to allow the user to command instructions to the remotely controlled device.

Although this step of providing most if not all of the functions for several individual entertainment apparatus in a shared remote controller helps simplify life for the ordinary "couch potato", it does little to straighten out the requisite use of a mishmash of commands typically necessary for the control of several entertainment apparatus such as the televisor and cable box. A most common result is that situation where the intercoupling signal established between a cable converter or a VCR and a televisor is mismatched, by having the televisor simply set to the "wrong channel". Ordinarily, channel 3 or channel 4 satisfies the intercoupling signal requirements. This means that the cable converter or VCR is preset to deliver an output signal on channel 3 or channel 4. This setting is most commonly preset by the user or installer by a small slide-switch or the like on the back panel of the converter box or VCR. On the other hand, the televisor is usually capable of being set to virtually any channel at least between 2 and at least 69, more or less in a contemporaneous televisor such as, for example, the Sharp Electronics Corp. Model 27L-S100 27-inch televisor.

As a result of this innate capability for a televisor to be readily tunable to many channels other than the necessitous channel 3 (or channel 4) it is not at all uncommon for a user to inadvertently set the televisor to a "wrong" channel, such as channel 5,11,34,51 or any one of the other 66 or so "wrong" channels. The result is improper operation of the televisor relative with the preset cable converter box or VCR originated signal. Ordinarily there is no way to realize this type of error in settings or even to quickly correct the error.

BACKGROUND OF MY INVENTION

Cable and Satellite television reception is ubiquitous in today's home. In the usual arrangement, a cable box or satellite signal receiver is coupled with an ordinary television set (or televisor). In such an arrangement, the incoming cable signal which may span channels 1 through 99 or more is converted to an intermediate channel signal and usually one of channel 3 or channel 4. Likewise, the satellite receiver may convert the incoming satellite signal which may similarly span many channels into a similar intermediate channel signal again usually one of channel 3 or channel 4.

Video cassette recorders (VCR) are nearly universal in today's contemporaneous home. VCR devices have several distinct operating modes. The primary betterment concerned with in this invention involves the ability for the VCR to receive an incoming cable (or antenna) originated signal and adapt it to that of the intermediate channel signal. The other mode of interest is where the playback of a video tape results in an intermediate channel signal couplable with the television set. As with the cable converter and satellite receiver, the VCR usually delivers an intermediate channel signal preset to channel 3 or channel 4.

In order for the television set to operate properly with this arrangement, it is necessary that the televisor be set to and maintained on the same channel as that of the preset intermediate channel originated by the "cable box", VCR or other apparatus. In other words, it behooves the user to keep the televisor tuned to channel 3 (or channel 4) as a necessary prerequisite for satisfactory viewing.

For example, if the cable box is set to tune an incoming program on channel 9 and the cable box "output" intermediate channel signal is preset to channel 3, the televisor must be set to channel 3. When the user changes the incoming program selection on the cable box from channel 9 to channel 63 (for example), the television must assuredly remain set on channel 3. If the user inadvertently alters the televisor setting, lets say to channel 5, the mismatch between the cable box channel 3 output and the televisor's channel 5 setting is ordinarily enough to interrupt television viewing or at least it will shift the incoming channel selections where a setting of the cable box to channel 63 may result in receiving a program from some incoming signal channel other than channel 63. At best, the result is merely annoying until the user realizes his error in changing the televisor setting from that of channel 3 to channel 5. At worst, the user may incur the cost of an unnecessary service call because "something appears to be wrong with the television set".

PROBLEMS WITH CURRENT ART:

In the real world, it is not at all unusual for a viewer to accidentally change the television channel selection, for example from the necessitous intermediate signal channel 3 setting, to an erroneous channel setting, such as channel 6, 15 or 39 for example. This misshapen state can happen for a variety of reasons, including:

Several "original equipment" remote controls are needed to operate the television and VCR or cable box. For example, one remote control is needed to turn the televisor on and off and adjust volume, or other viewing parameters such as brightness, etc. A second remote control is then needed to select a preferred program channel on the cable box, VCR or whatever other accessory is involved obviously this requirement for more than one control can, in and of itself, lead to confusion and of course resetting the intermediate channel selection for the televisor to a "wrong channel", say rather than the necessitous channel 3 is likely to occur.

A handheld "universal" remote controller may be used which replaces two or more manufacturer's original equipment remote controls. A typical universal remote control, such as a RCA "SystemLink-4" Model RCU1400VP, includes four buttons marked TV, VCR, CABLE and AUX. Pressing the appropriate button places the remote controller in each of the available modes in order to operate with the associated televisor or accessory apparatus. Other remote controls, such as the SANYO "Moonlight" Model RMT-U100 and the Universal Electronics Inc. "One-For-All" Model 4060 operate in a similar manner and thus they afford equivalent mechanisms for introducing user error. Quite simply it is the obvious likelihood that pressing the "wrong buttons" may introduce the "wrong operation". Extend this to the usual real life setting found in a dark room, maybe including distractions. Add eyesight limitations and age issues and every chance for mistaken operation is present. The result is attempted operation of a cable box or VCR with a televisor, while the televisor is set to the wrong intermediate channel choice. The consequence is mixed up operation, wrong channel selections or perhaps just a snowy screen with no picture.

FIELD OF MY INVENTION

My invention generally pertains to wireless remote controllers of all types and in particular to portable or hand-held remote controllers commonly used for remotely entering the channel selection and other commands into televisors, cable boxes and other necessarily intercoupled entertainment equipment More pointedly, my invention pertains to the concurrent synchronization of requisite settings between a plurality of apparatuses hooked together in an operational group. Loosely translated, this says that the purposeful primary command submitted to one device is accompanied by a concurrent issuance of a secondary instruction automatically submitted to an accompanist device.

SUMMARY

A number of objectionable consequences of a misadjusted intermediate signal channel selection on a televisor are best overcome, in accord with this invention, through the expedient of a nearly simultaneous sending of two or more command signals between the remote controller and the remotely controlled apparatus. In accord with the invention, an encoded user selection command signal is translated from the remote controller to the cable box or VCR to set it in accord with the user's choice of incoming program channel preference, for example channel 21 or channel 63 or any other available channel. The result of this user initiated command selection is to pick a preferred channel and convert it into a secondary or interlink channel signal.

It is common practice at this time to use either of channel 03 or channel 04 as the interlink signal selection. The usual VCR or cable box is equipped with a "slide-switch" or its equivalent function to select between the necessitous channel 03 or channel 04 while an output connection is provided which is capable of delivering the converted program content signal to an accompanying TV-set or other device.

My invention's paramount novelty resides in establishing a fully automatic, self-initiated sending of a second and essentially concurrent channel selection or other command to a TV-set or similar apparatus. The idea is to make sure that the TV-set or whatever is properly set to the necessitous interlink program signal channel 03 (or channel 04). Furthermore, this sending of the second channel selection command is preferably accomplished so as to be essentially transparent to the user. In other words, the user's selected preferred channel selection and the necessitous second channel selection are sent in a near simultaneous time frame, thereby reasserting the second channel selection without user intervention.

In a usual remote controller arrangement, the portable remote control device is handheld and is fitted with a keypad having digits 0–9, plus several other commands available as separate keys offering convenient keystroke entry by the user. More importantly the usual, or prior remote controllers submit the selected command or channel selection to the associated remotely controlled apparatus as a singular command signal, encoded for exclusive command of that controlled apparatus. To accomplish this feat, the remote controller is ordinarily fitted with a read-only memory (ROM) which holds a library of code sequences for a variety of possible TV-sets, cable boxes, VCRs or other devices which might be controlled by a user. Unfortunately, the remote controller can only utilize ONE of these codes at a time. Yes, universal remote controllers can be set to two or more different unique modal codes offering selectable control of several apparatuses by the same control, but they do this as virtual single control devices. In other words, if they are set to the Cable Box mode, the signal does not control the TV-set. In practice, these unique codes are usually established as 3-digit or 4-digit numerical codes obtained from a tabulation provided by the remote controller manufacturer. Typically, the codes are included in a printed manual that accompanies the remote controller when it is purchased. Alternatively, most makers offer internet access via a proprietary website in which they list the pertinent codes and any updates to the code list.

A 3-way REMOTE CONTROLLER:

A three-way remote controller providing three mode selections is a quite common configuration. Typically, the selection might be TV-SET, CABLE BOX and VCR. Often a fourth AUXiliary mode is provided, useful with any of a variety of devices. The acute problem with this form of prior art is that if a code is selected, say for a TV-set of 1234, for a code of 2413 for a cable box and 3142 for a VCR. Only the corresponding code is sent for each selected mode. For example, if the remote controller is set to the cable box mode and a keypad entry for channel "39" is submitted by the user, the remote control signal sent to the remotely controlled cable box is firstly the code 2413 weighted as 3 followed by the code 2413 weighted as 9. As a result, only the cable box responds, setting the INPUT to 39. Nothing more normally happens in this sequence.

CONCURRENT MULTIPLE DEVICE CONTROL

The submission of a primary command to the cable box to set the channel selection to channel 39, for the mentioned example does not assure correct and proper operation of the cable box in conjunction with the TV-set. For example, if the TV-set is inadvertently set in error to channel 6 and not the necessary channel 3, erroneous performance ensues. Most specifically, the user selected program channel either does not appear or else appears as the wrong program carrying channel. This malfunction is exasperated by the preponderance of contemporary televisors not providing ready readout of what channel they are truly set to. The channel selection is usually presented as a briefly occurring on-screen display, which unfortunately may be overlooked or confused with program content. Or whatever! The correction of this malfunction is even more difficult, especially for the technically disinclined and persons who are easily confused, such as the aged. The correction consists of changing the remote controller mode from VCR to TV-SET, entering the keypresses 0 plus 3 (e.g., channel 03) for submission to the TV-set. Then the remote controller must be returned to the CABLE box mode and the user desired channel must be entered.

If a cable box, VCR and TV-set are used together in a quite common hookup, this makes it possible for one setup combination of interlink channel 03 signal combinations to be correct accompanied by three possible "wrong" combinations.

Since the different code combinations exist in the remote controller, it is the underpinning novelty of my device to respond to a user's determination for setting the incoming cable program to channel 39 by submitting the cable box recognized command signal 2413 weighted as 3 plus 2413 weighted as 9 concurrently accompanied by the TV-set recognized command code 1234 weighted as 0 plus 1234 weighted as3. Being sent together enables the cable box to switch to 39 and reasserts that the TV-set input is set to channel 03. Bingo! The necessitous signals coupled between the cable box and the TV-set are set to work harmoniously and bring the user his channel choice as a viewable image.

Extend the essential novelty of my invention further and automatic maintenance of necessitous channel settings for a VCR and the TV-set may be obtained. Using the previous example, in addition to the mentioned encoded signals sent to the cable box and TV-set, an encoded VCR command signal of 3142 weighted as 0 plus 3142 weighted by 3 is simultaneously sent with the other two command sendings.

Obviously my showing is extensible to more than three apparatuses, or by inclusion of a switch the supplementary commands may be enabled or disabled. Disablement is merely suggested to enable a more experienced user to gain full control over the inter-equipment necessitous channel settings for whatever reason.

OBJECTIVES

An objective of my invention is to reassert adjustment of a necessitous signal or channel selection between a television tuning device such as a cable box and a televisor concurrent with each user-submitted change in incoming program channel selection.

A key purpose for my invention is to automatically reestablish tuning compatibility between the intercoupling signal output of a program signal tuning device, such as a VCR or cable box and the input of a televisor or similar intercoupling signal receiving device.

Another object for my invention is to simplify a user's operation of a television set in conjunction with any combination of accessory equipments, such as a cable box, satellite receiver, VCR, DVD, instant replay device and similar commonplace items.

DESCRIPTION OF DRAWINGS

My invention is depicted in 18 sheets of drawings showing 19 figures, including:

FIG. 7 Graphical showing of user entries sending user selected command signals and preset command signals.

FIG. 8 Graphical showing of user command preceding preset command.

FIG. 9 Graphical showing of preset command preceding user command.

FIG. 10 Graphical showing of user command sending delayed until second user command entry is submitted.

FIG. 11 Graphical showing necessitous command delayed until a second user selection command has been sent.

DESCRIPTION OF INVENTION

Figure 1:
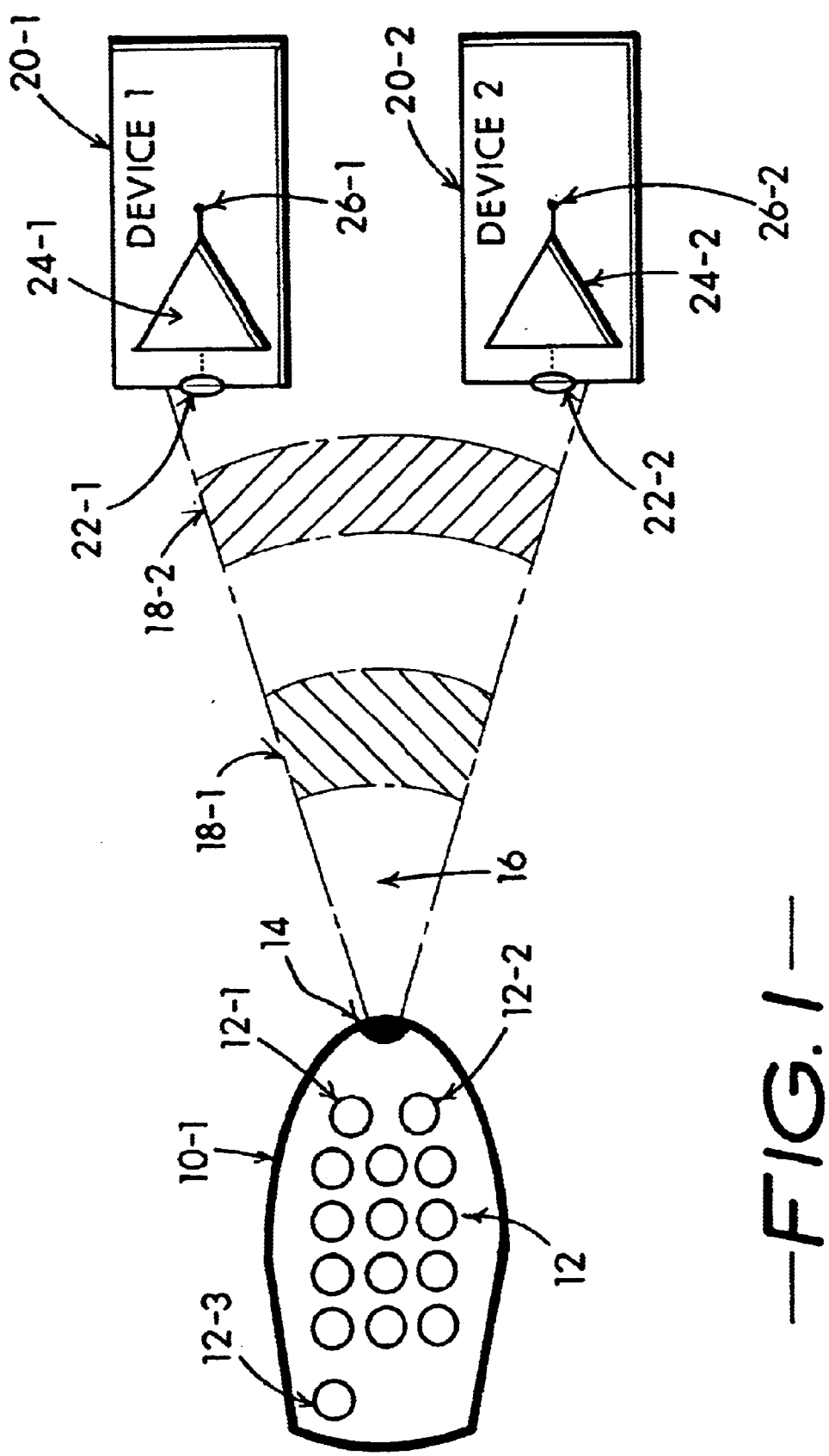
FIG. 1 A remote controller sending commands to two separate remotely controlled devices.

A portable (usually hand held) remote controller 10-1 appears in FIG. 1 to include a keypad 12 providing several finger actuatable keybuttons, such as numerals 0–9. The purpose of my remote controller, as it is with most remote controllers of others, is to send a command encoded wireless and usually infrared signal from a port 14. In my invention the wireless signal manifests itself as a coupling beam 16 that links the remote controller 10-1 with an input port 22-1 of a device1 20-1 and the input port 22-2 of a device2 20-2. Preferably the linking between the two input ports 22-1, 22-2 are reached with the same beam 16 without moving the controller 10-1.

The controller 10-1 defines the coupling beam 16 to preferably include two distinctive signal components 18-1, 18-2. In my invention's usual practice, the signal component 18-1 is encoded with data which is received by the device 20-1 to be amplified and processed 24-1 to deliver a primary command signal 26-1 replicate of the command originated by the controller 10-1. Additionally, the signal component 18-2 is usually encoded with a preset data value which is received by the device 20-2 to be amplified and processed 24-2 to deliver a secondary command signal 26-2 replicate of the preset data value.

Figure 2:
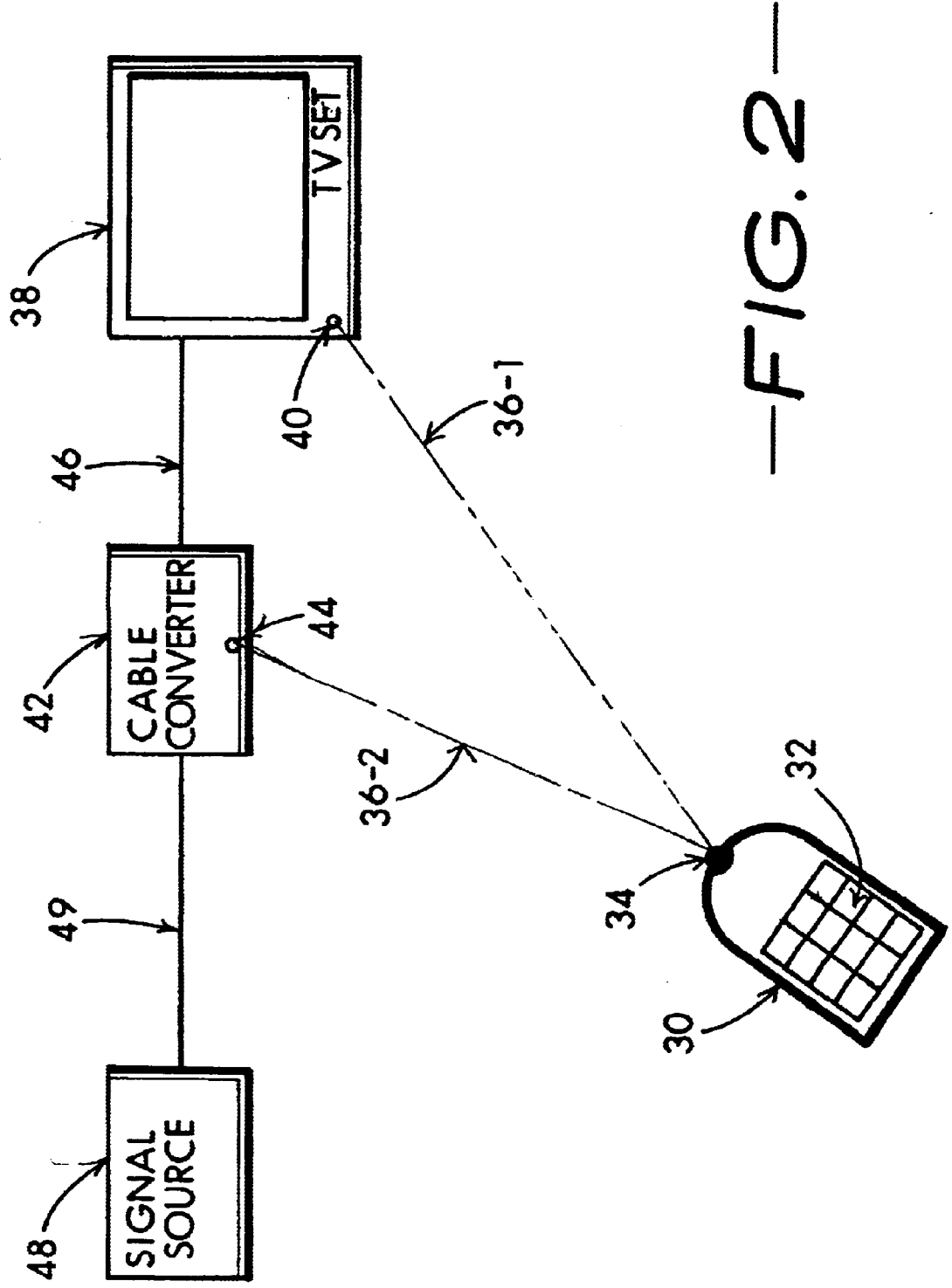
FIG. 2 Showing a remote controller having two beams one coupled with a cable converter and the other with a TV-set.

A common practice of my invention is shown in FIG. 2 to include a cable converter 42 receiving a plurality of incoming signals 49 originating from a signal source 48. The output of the cable converter 42 delivers a fixed channel signal on line 46 that couples with a signal input connection of a TV-set 38. A user of the remote controller 30 enters keypad 32 actions to submit a channel number preference (such as 26) as a signal beam 36-2 originating from the controller's port 34 to an input port 44 of a cable box 42 or the like. As a result, channel "26" incoming signals on line 49 may cooperated with the cable converter 42 to deliver (typically) a fixed channel 3 or channel 4 signal on an interlinking line 46, modulated with the incoming channel "26" signal's essential information.

Concurrent with the remote control's sending of a signal beam 36-2 is a complemental signal beam 36-1 that submits a predetermined channel number preference to the televisor port 40. Ordinarily this sets (or reasserts) the TV-set 38 tuner setting to accept the channel 3 or channel 4 interlink line signal.

Figure 3:
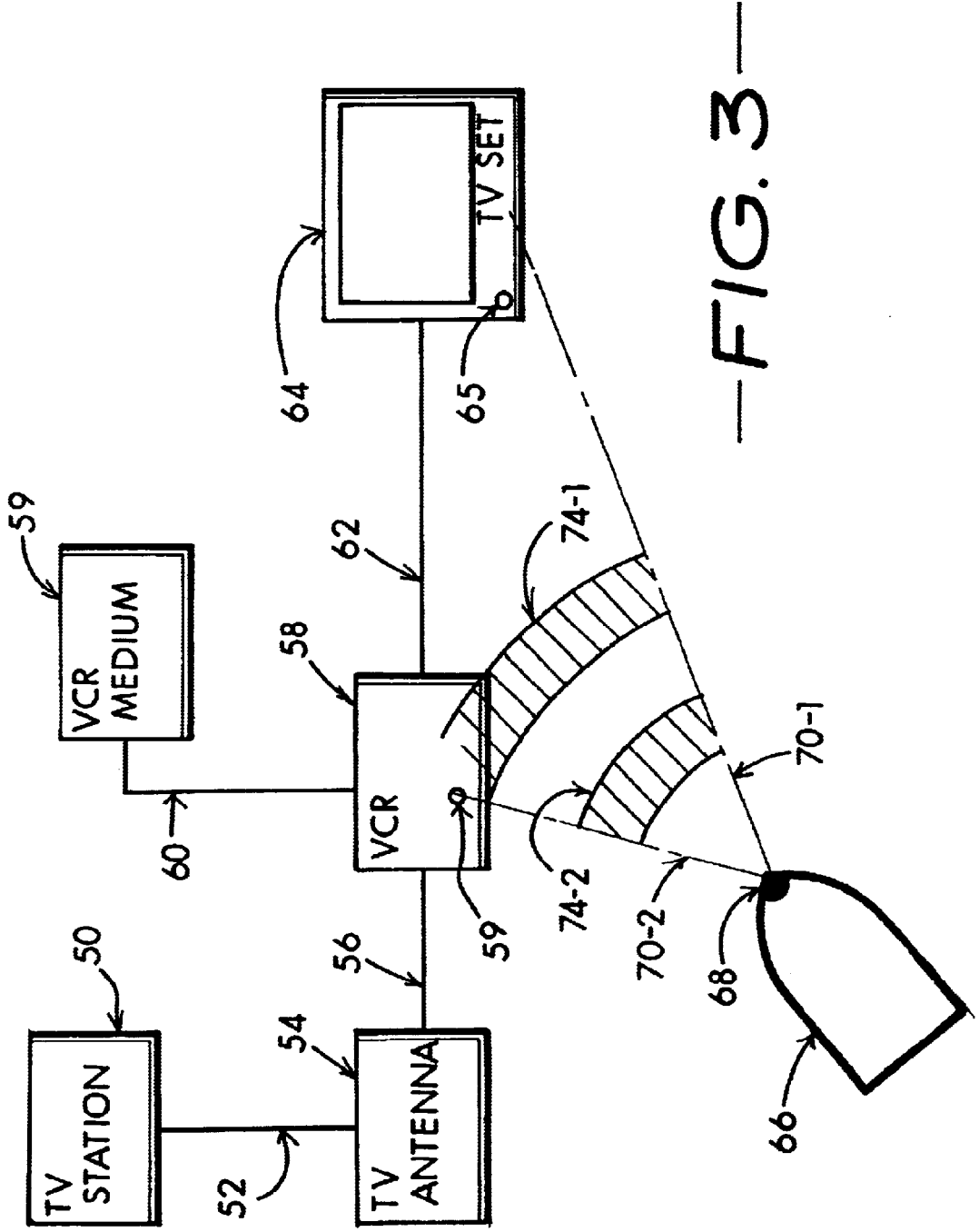
FIG. 3 Showing a remote controller coupled with a VCR and a TV-set and showing a program source.

In FIG. 3 I show a TV-Station 50 as a source of program signal, coupled 52 with a TV-antenna 54 in a well known manner. The TV-antenna 54 delivers the intercepted broadcast TV signal 52 and delivers it 56 to the input of a video cassette recorder (VCR) 58. A source of video signals may thereby be derived from either the incoming signal 56 or alternatively, a VCR medium (e.g., a video tape) 59 may serve as a source when coupled 60 into the VCR 58.

The usual VCR (or for that matter, DVD player and similar device) typically couples a signal on an interlinking line 62 with an input of a TV-set 64. Usually the interlink signal on line 62 is preset in conjunction with the VCR to one of channel 3 or channel 4.

In my invention, a remote controller 66 is utilized by a user to deliver a composite wireless beam 70-1 from a sending source 68 which is laid forth to become intercepted by the VCR port 59 and TV-set port 65.

When the user selects a channel (say "58") for setting of the input of the VCR, a first portion 74-1 of the sender beam 70-1 is modulated with an encoded signal which is uniquely recognized by the VCR through the receptor port 59 to set the input of the VCR (the VCR tuner) to that channel (for example "58"). At the same time, a second portion 74-2 of the sender beam is modulated with an encoded signal which is preset to channel "3" (for example) and which is uniquely recognized by the TV-set through the receptor port 65 to set the tuner portion of the TV-set to channel "3". Realize that the first portion 74-1 and the second portion 74-2 of the sender beam 70-1 may occur in a sequence where either one may precede the other as a matter of mere design choice.

Figure 4:
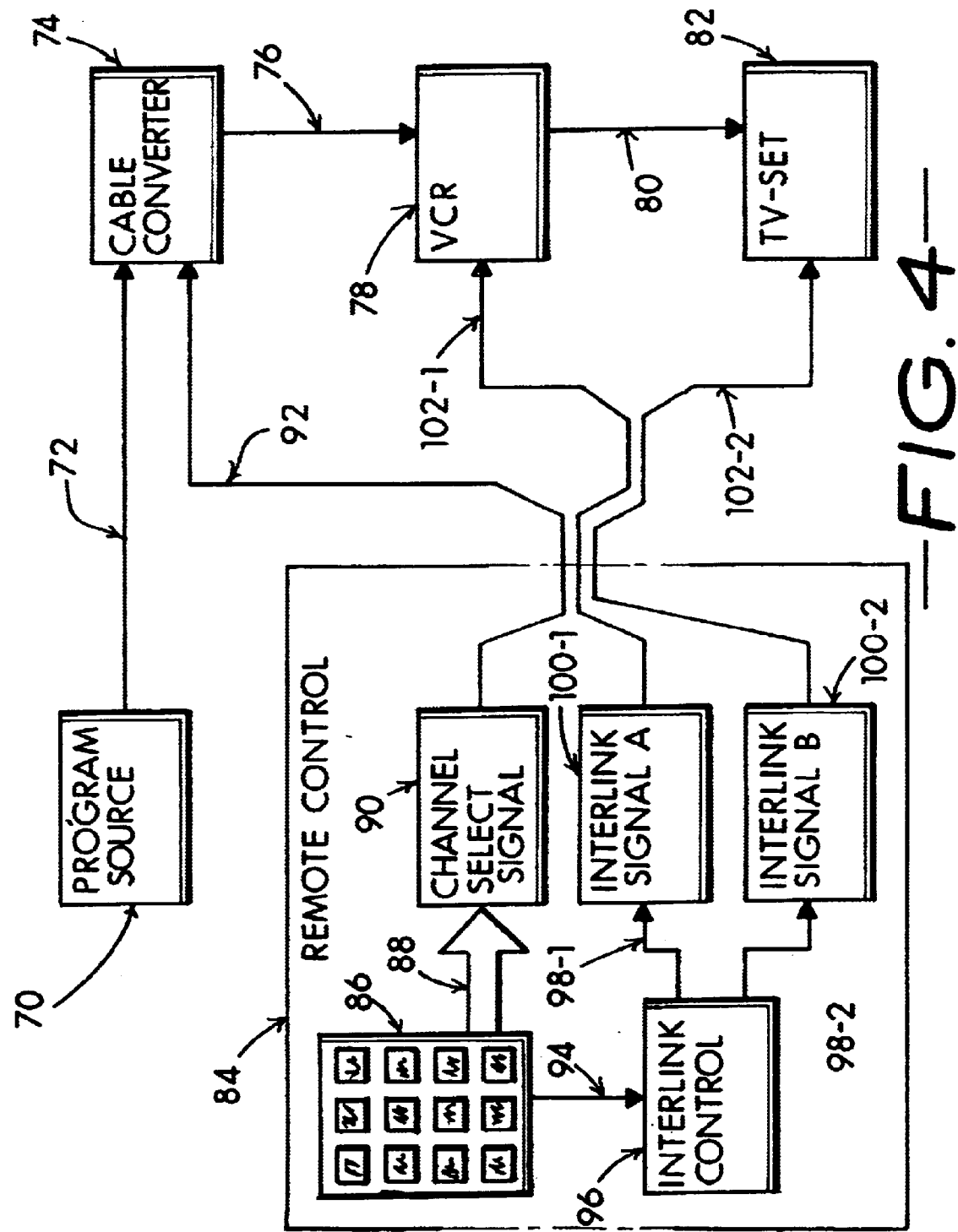
FIG. 4 Depiction of a remote controller coupled with 3 different remotely controlled apparatus, giving distinct commands to each.

With the view of FIG. 4 I show a more elaborate arrangement where an incoming cable signal may provide a program source 70 coupled 72 with an input of a cable converter (or "cable box") 74. As known in the artfield, the cable box delivers a first interlink signal usually set to channel "3" (or "4") that couples to an input of a VCR (or DVD) 78. As is usual practice for VCR's and similar devices, the incoming signal may be recorded or may simply pass-through the VCR coupling via the second interlink signal line 80 with a tuner input of a TV-set 82.

An architectonic overview of another form for my invention is depicted by a remote control 84 of this FIG. 4 in which a keypad 86 enables a user to make preferred entries. The selection data is delivered 88 to a channel select signal function 90, typically including an encoder and wireless signal driver. An input to the encoder is ordinarily controlled by the selection data 88 which determines the immediate "signature" of the encoder and wireless signal driver output 92 that couples with the cable converter 74. As a result, if the value "3" and "5" are entered into the keypad 86 by the user, the signal on line 92 is weighted to represent "35" and the input of the cable converter 74 is tuned to channel "35".

A keypad entry also develops a keypad activity signal on line 94 which couples with the interlink controller 96. It is the purpose of the interlink controller to develop an interlink sequence control signal on each of lines 98-1, 98-2.

The signal on line 98-1 sets the interlink signal-A function 100-1 into action, delivering a wireless signal 102-1 to the VCR device 78. It is the purpose of this signal to set, or reassert the setting of, the VCR 78 input to match the first interlink signal on line 76. Usually the input of the VCR is set to channel 3 or 4 to match the signal delivered from the cable converter 74 output.

The signal on line 98-2 sets the interlink signal-B function 100-2 into action. It is the purpose of this signal to set, or reassert the setting of, the TV-set 82 tuner input to match the second interlink signal on line 80. Usually the input of the TV-set is set to channel 3 or 4 to match the signal delivered from the VCR 78 output.

You must realize that every time a user submits a channel change to the cable converter over the wireless signal link 92, setting the cable converter to some arbitrary user-preferred selection an automatic signal is subsequentially sent to the VCR and TV-set, or other devices, to set, reset or reassert their necessitous setting to match that of the interlink signals delivered over lines 76 and 80. Sometimes I refer to these interlink signals as necessitous signals and interface signals.

Figure 5:
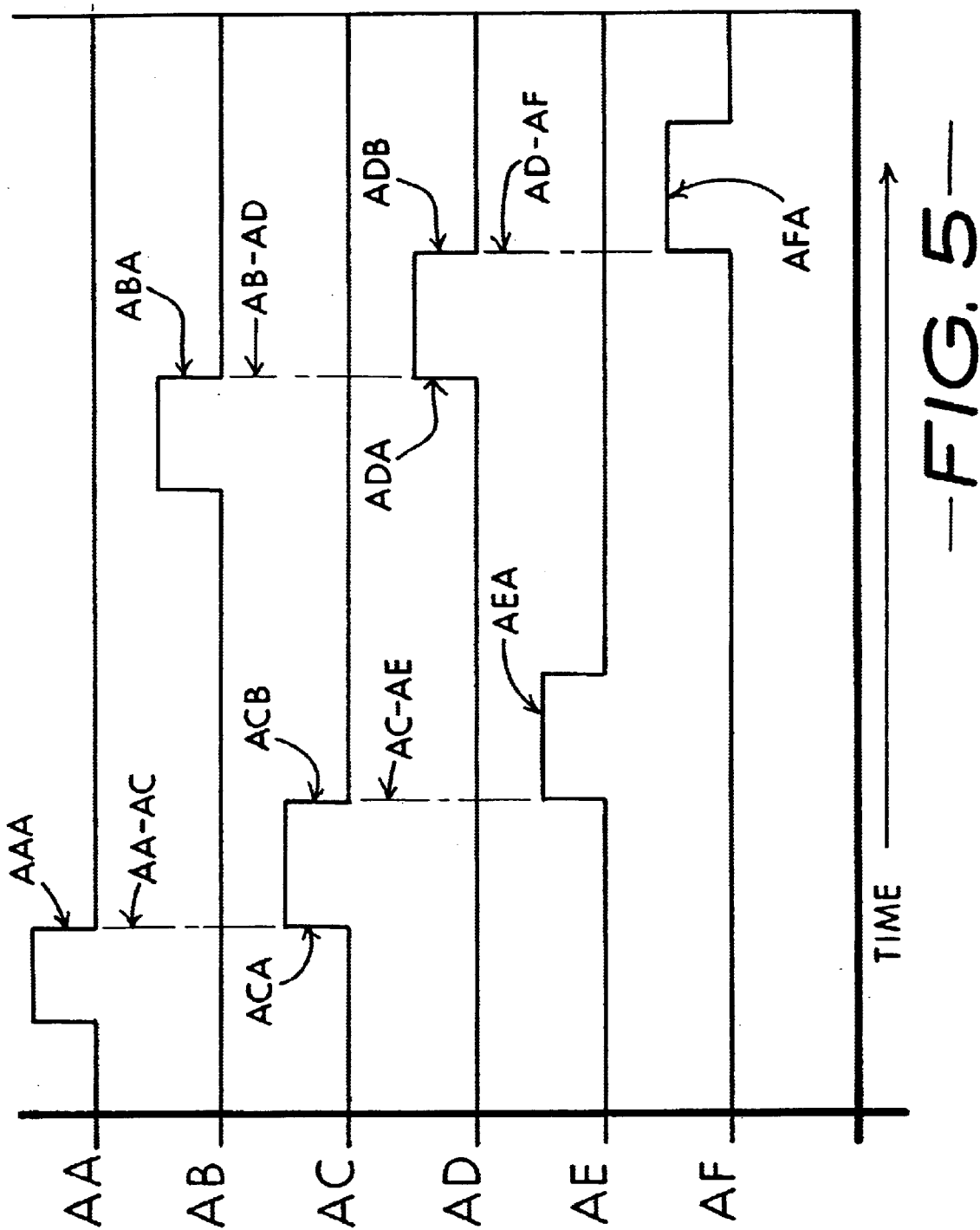
FIG. 5 Graphical showing of user entries delivering command signals.

A look now at FIG. 5 will provide you with a graphical view of various signal function interrelationships. The several line representations are:

| | |
|---|---|
| AA | First Key Button Input |
| AB | Second Key Button Input |
| AC | Sending First Encoded Key Signal |
| AD | Sending Second Encoded Key Signal |
| AE | Sending First Interlink Digit |
| AF | Sending Second Interlink Digit |

When a user enters his preferred channel selection, the first selection key button AAA is pressed. Concurrent with the first selection and occurring anytime between its initial activation until its trailing edge (or completion and release) as depicted by line AA–AC, the selected value is "sent" as an encoded first selection digit ACA–ACB. Upon completion of a sending of the first selection digit AC–AE an encoded signal AEA is next sent which is predetermined to set or reaffirm the interface channel selection on the cable converter 42 of FIG. 2 or VCR 58 of FIG. 3 for example.

If the necessitous interface channel selection is "3" the values "0" and "3" must be sent in sequence. Therefore, the encoded digit AEA may be the value "0".

Similarly, when the user makes his second selection key button AEA entry, the activation is cause to send the encoded value ADA–ADB to the remote apparatus to establish the desired channel selection. Upon completion of the sending of the second selection digit ADA–ADB a second encoded signal AFA is next sent which in the mentioned example of preset channel "3" preference, assumes the value "3". The result is that the preferred channel selection is sent as two user picked digits ACA–ACB and ADA–ADB while the necessitous channel selection to assure proper interlink match between the apparatus is sent as two preset digits "0" and "3" (in this example).

Figure 6:
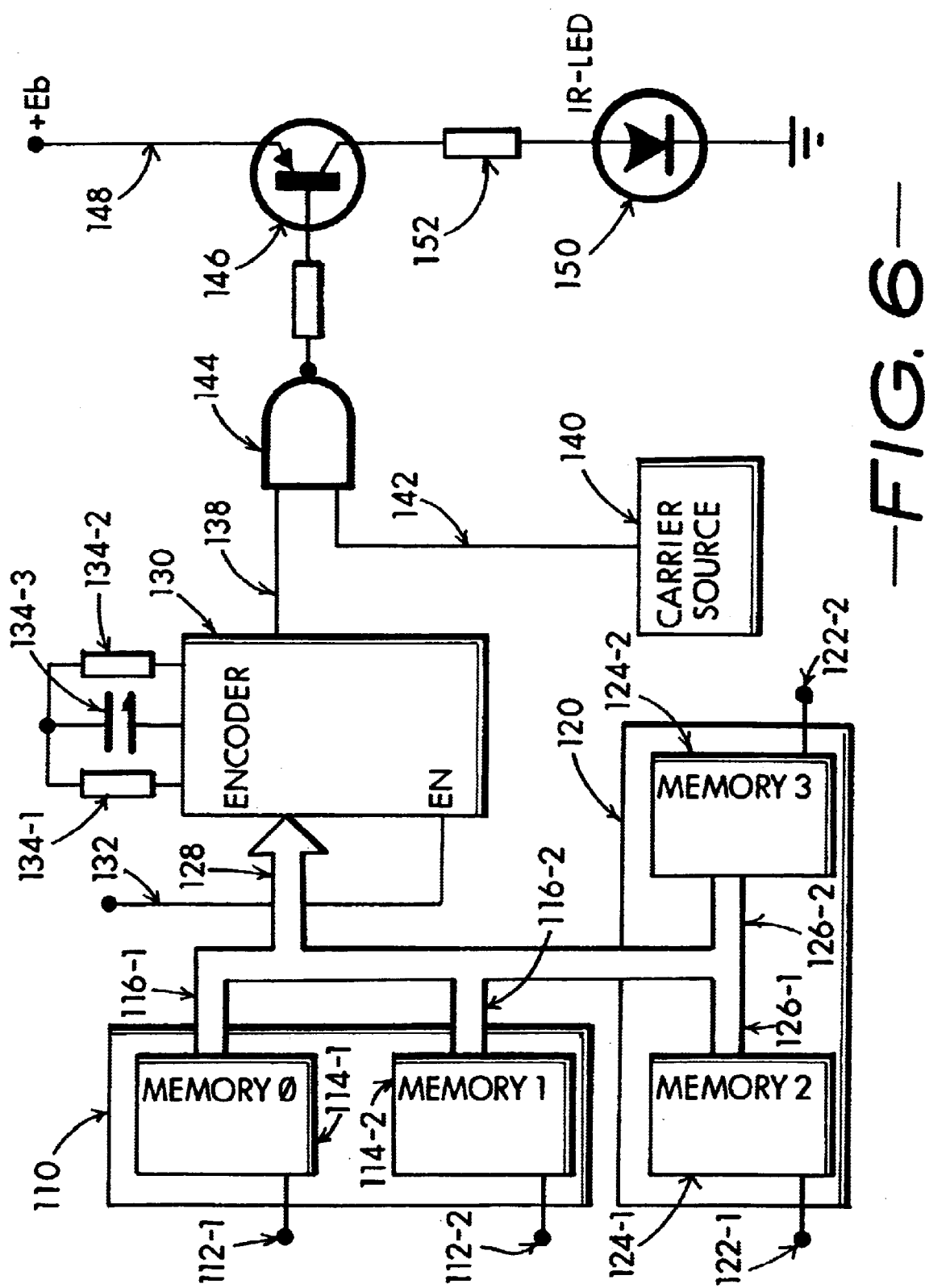
FIG. 6 Diagram showing multiple memory storage of encoded signals, their encoding and subsequent modulation of a carrier for transmission by infrared emitter.

The functional diagram of FIG. 6 is operationally extensive from the signal flow depicted in FIG. 5. For example, in FIG. 6 the inputs 112-1 and 112-2 correspond with the signal depicted on line AC (ACA–ACB) and AD (ADA–ADB) of FIG. 5, respectively. Furthermore the inputs 122-1 and 122-2 of FIG. 6 correspond accordingly with line AE (AEA) and line AF (AFA) of FIG. 5.

In FIG. 6 a memory 110 is utilized to form the encoding instructions in response to an input selection. MEMORY-0 portion 114-1 is recipient of the user selection ACA–ACB on input 112-1 and delivers a binary instruction on the bus line 116-1 to an input terminus with an encoder 130. It is the unique weight of the binary sequence on the bus line 128 which defines the encoder's immediate output pattern sequence delivered on line 138 uniquely indicative of the users instant keystroke instruction AAA of FIG. 5.

Similarly, a MEMORY-1 portion 114-2 receives the user selection ADA–ADB signal on line 112-2 and delivers a further binary instruction on the bus line 116-2, again to the input terminus with the encoder 130. As before, it is the unique binary sequence on the bus line 128 which defines the encoder's next output pattern sequence as delivered on the line 138 and it is further uniquely indicative of the user's second instant keystroke instruction ABA of FIG. 5.

To develop the necessitous, or interlink control signal a separate memory 120 is utilized. This memory includes two memory portions, having distinctive inputs 122-1, 122-2. The input 122-1 couples between the signal AEA discussed for FIG. 5 and a memory MEMORY-0 portion 124-1, delivering an encoder control signal on bus line 126-1. In the formation of an automatic sending of a preset interlink setting channel "3", this value is usually a value "0".

Similarly, the input 122-2 couples between the autogenerated signal AFA and a MEMORY-1 portion 124-2, from which an encoder control signal is delivered on a bus line 126-2. Again, in the formation of the automatic sending of the preset interlink setting channel "3", this value is usually a value "3".

The result is a sequence of binary instructions on the bus line 128 which defines the encoder's interlink signal output patter sequence as delivered on the line 138. Ordinarily it is uniquely indicative of an interface channel selection of "03" or "04". In the practice of my invention, it is said that the interface channel selection developed on the bus lines 126-1, 126-2 is submitted automatically and transparently to the user every time the user makes a preference selection on the keyboard which effects a change in the key entry signal AAA and ABA of FIG. 5.

In FIG. 6, the encoder which may be a device such as a Motorola MC145026 or a more contemporaneous equivalent. I show the inclusion of the encoder's typical timing components 134-1, 134-2, 134-3 as merely representative of the MC145026 device. Ordinarily, the MC145026 device operates with a self-oscillatory frequency in the range of about 4 to 9 kilohertz. I realize that other arrangements by other makers may be used, so long as the essence of this invention is satisfied.

A carrier source 140 comprising a known oscillator embodiment may typically deliver a carrier frequency in the range of 32–99 kilohertz (more or less) on line 142 to the input of a summer, depicted here as a NAND gate 144 and typified by an industry standard CD4011B. The summer serves to modulate the carrier signal arriving on line 142 with the encoded format signal developed by the encoder 130 and delivered via line 138.

The resulting modulated carrier obtained from the summer is utilized to drive the base of a PNP transistor 146 having an emitter connection 148 with a source of $+E_b$. The transistor 146 collector is usually coupled through a ballast resistor 152 with an infrared light emitting diode (IR-LED) 150. The IR-LED is the sender, typically producing a succession of gated light beam rays which couple with a distant receptor on a VCR, TV-set, cable box or other controlled device.

With FIG. 7 I show several operating events:

| | |
|---|---|
| BA | First Key Button Input |
| BB | Second Key Button Input |
| BC | Sending First Encoded Key Signal |
| BD | Sending Second Encoded Key Signal |
| BE | Sending First Interlink Digit |
| BF | Sending Second Interlink Digit |

The user makes his keypad selection. Upon pressing the first keybutton entry BAA, a signal is submitted EA–BC sometime during the entry BAA duration BAB–BAC to urge the first digit encoder control signal BCA, which may couple with the input 112-1 of earlier FIG. 6. Completion of the first user picked digit as denoted by BC–BE sets the first necessitous, or iterlink digit signal into effect. In other words the signal BEA couples with the input 122-1 of FIG. 6. As a furtherance of my prior example, the completion of the first interlink signal digit BE–BF I say to urge a second preset interlink signal digit BFA as usually coupled with the input 122-2 of FIG. 6.

Subsequentially, when the user makes his second preferred channel selection choice by a key entry BBA is show a sending of the second digit command signal BDA to occur essentially any time during the interval BBB–BBC as depicted by line BB–BD and as coupled with the input 112-2 of my earlier FIG. 6.

In a sequence similar to the first user digit entry BAA, I utilize the completion of the sent second user selection digit BDA to urge BD–BE the first necessitous digit BEB and subsequently to urge BE'–BF' the second necessitous digit BFB.

You will realize that for each user selection digit, in this variation of my invention a full two-digit necessitous channel (setting) selection signal comprising the first digit BEA (or BEB) and the second digit BFA (or BFB) is submitted to the subordinate apparatus to assert or reassert the correct interlink compatibility.

With FIG. 8 and FIG. 9 I show that the order of sending the channel-change instructions, etc. is reversible. In other words, as FIG. 8 shows on line CA, The user preferred channel selections CAT1, CAT2 may be sent in the interval CAA–CAB, immediately followed by the preset necessitous channel assertion signal CAC–CAD including the first digit CAT3 and usually a "0" immediately followed by the second digit CAT4 and usually a "3" or a "4". The main thing to note is that the signal CAA–CAB is sent before the signal CAC–CAD.

On the other hand FIG. 8 shows on line DA, the preset necessitous channel selections DAT1, DAT2 may be first sent in the interval DAA–DAB, immediately followed by the user preferred channel assertion signal DAC–DAD including the first selected digit DAT3 immediately followed by the second user selected digit DAT4. In this showing, main thing to note is that the signal DAA–DAB is sent before the signal DAC–DAD, and essentially in a reverse order depicted for FIG. 7.

With FIG. 10 I show a fully different operating sequence in which the users first digit selection entry EAA on line EA initiates on line EB an elapse of time EBAA–EBAB having an undefined duration EBT. This time represents the interval which may elapse between the time a user presses the first entry key EAA and next makes the selection ECA for the second user preferred digit, as expressed on line EC.

Observe that no matter how long the delay between the first entry EAA and the second entry ECA, the first user preference encoded signal EDA does not send until the second entry ECA is underway. This overcomes a commonplace problem with many controlled apparatus, such as cable boxes, satellite receivers, VCR's and TV-sets where the first entry "times out" before the second entry can be made if the second entry does not come soon-enough. This time allowance EBT eases the requirements for use of the remote controller, particularly for elderly, physically limited, or indecisive users.

This FIG. 10 also shows on line EE an automatic sending of a first interlink setup signal EEA, for example "03" to the VCR 78 of earlier FIG. 4. At the same time, line EF shows an automatic sending of a second interlink setup signal EFA, for example "04" to the TV-set of FIG. 4.

In FIG. 11 you will find a depiction of a first user preference key entry FAA on line FA. The initiation of this key entry FA–FC serves to initiate the sending of an encoded user preference selection signal FCA depicted on line FCA to, for example, the cable converter 42 of FIG. 2. A subsequent entry of a second user preference key entry FRA on line FB urges (lines FB–FD) the sending of a second encoded user preference selection signal FDA shown on line FD as secondly submitted to, the cable converter 42 of FIG. 2. Immediately subsequent to the sending of this second digit signal FDA as depicted by lines FD–FE, you will observe that a preset interlink setup signal is sent, comprising for example the digits "0" and "3" in rapidfire succession as necessary to reassert the interlink frequency setting for the TV-set 38 of FIG. 2.

Figure 12:
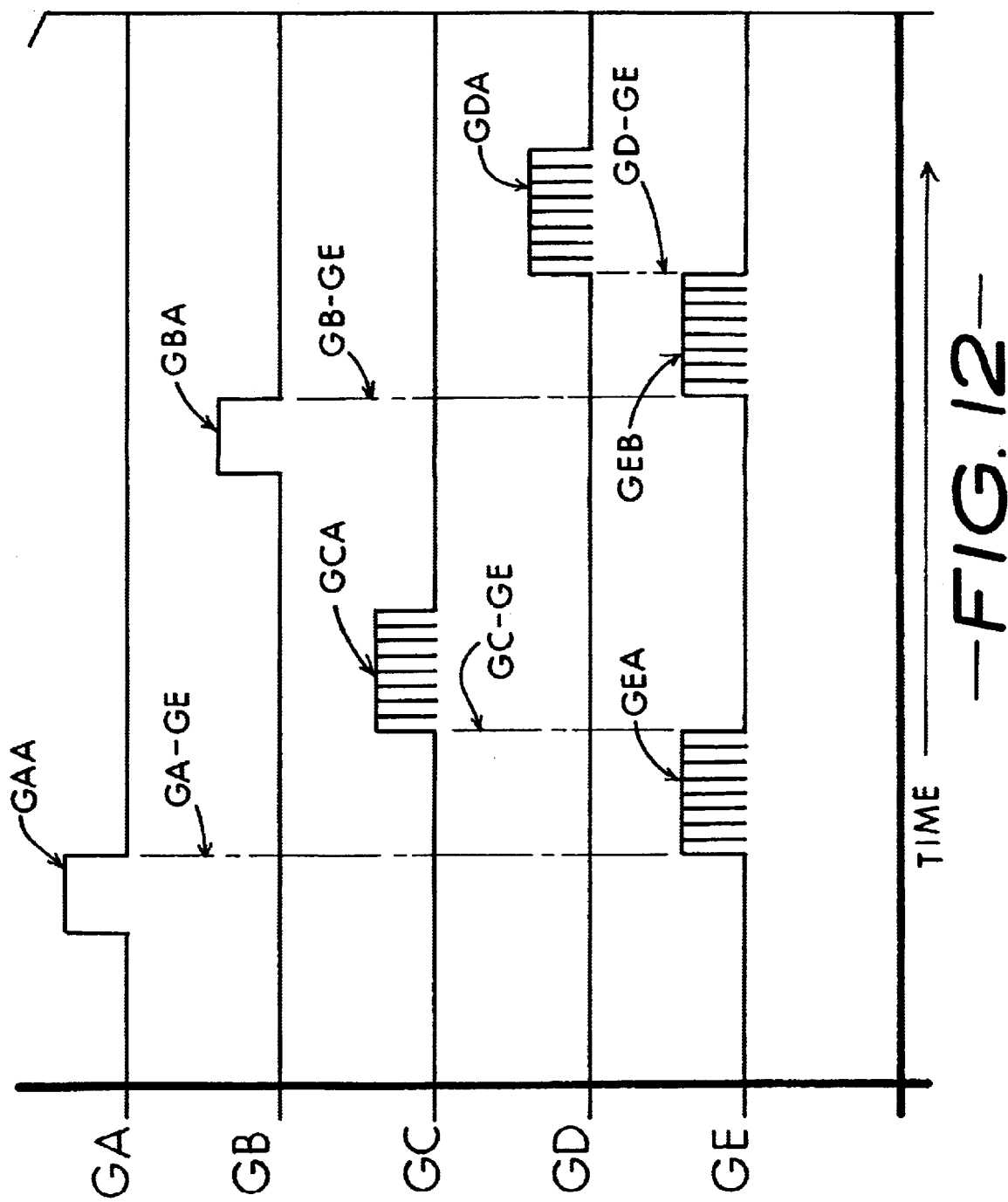
FIG. 12 Graphical showing necessitous command submission following user preference entry, followed by a sending of the user selection signal.

With FIG. 12 I show the following instructions:

| | |
|---|---|
| GA | First Key Button Input |
| GB | Second Key Button Input |
| GC | First Encoded Digit Signal |
| GD | Second Encoded Digit Signal |
| GE | Sending Interlink Digits |

A user preferred selection is entered as a first digit GAA where it urges GA–GE a sending of a first of usually two interlink setup signals, and usually the digit "0", to the TV-set 64 of FIG. 3, for example. Immediately after the signal GEA is sent, the value of the user's first entry (and usually a value between "0" and "9") is sent as signal GCA to, for example, instruct the VCR 58 of FIG. 3.

Soon thereafter the user is likely to submit a second key-press entry GBA. Similar to the first entry in action, this second user entry initiates a sending of the second encoded digit component GEB of the interlink setup signal, and usually a value "3" or "4", to the TV-set 64 of FIG. 3. Again, immediately after the signal GEB is sent I show a sending of the user's second entry as a signal GDA to set the VCR 58 of FIG. 3 to the user's desired incoming program signal.

Figure 13:
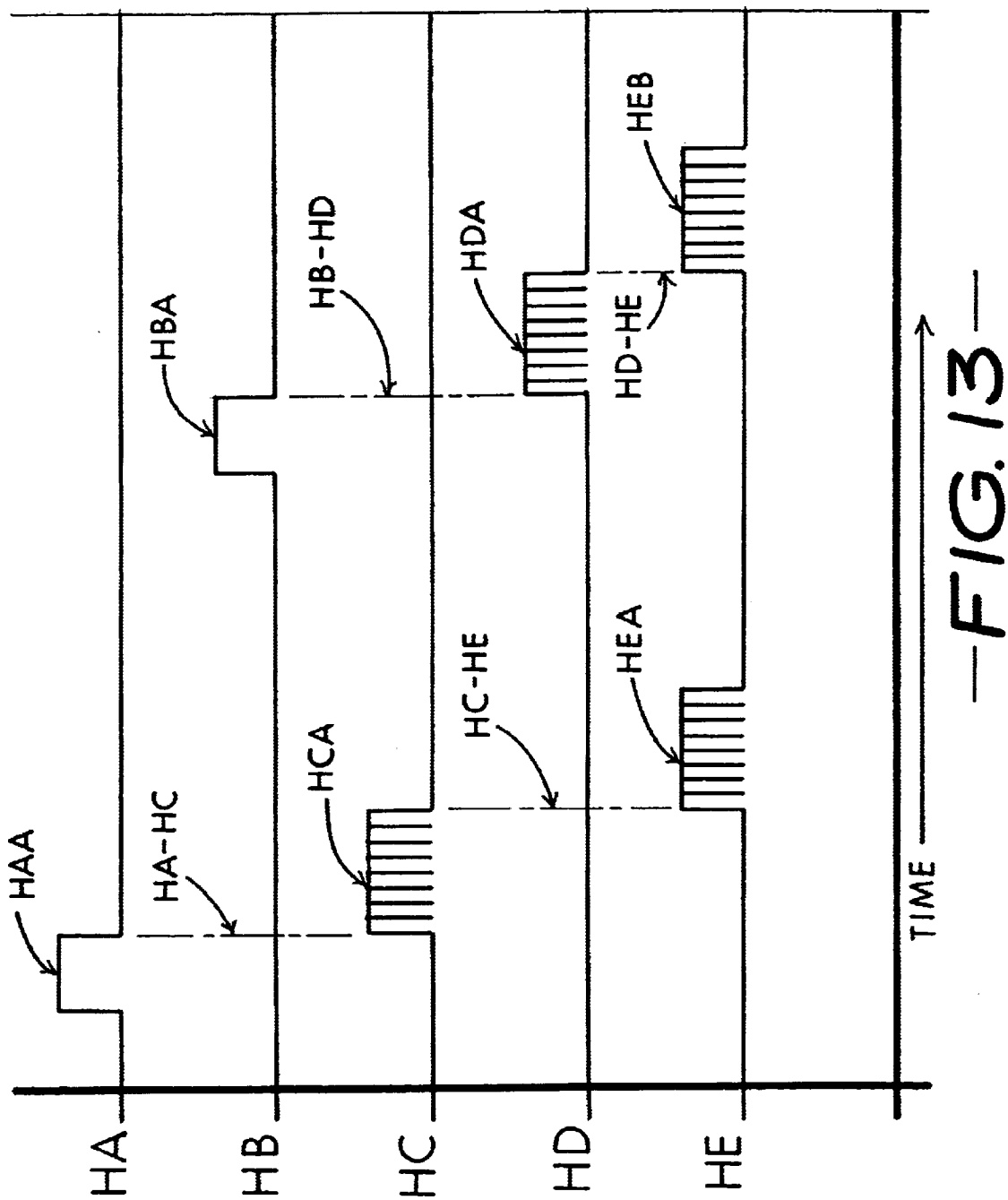
FIG. 13 Graphical showing of user entry selection signal sent prior to preset signal.

With FIG. 13 I show the following instructions:

| | |
|---|---|
| HA | First User Selected Key Button Input |
| HB | Second User Selected Key Button Input |
| HC | First Encoded Digit Signal |
| HD | Second Encoded Digit Signal |
| HE | Sending Interlink Digits |

A user preferred selection is entered as a first digit HAA where it urges HA–HC into a sending of the users first entry (and usually a value between "6" and "9") as a signal HCA to the VCR 58 of FIG. 3 as a first of two incoming program channel selection entry values. Immediately following the signal HCA sending as shown by line HC–HE the first of usually two interlink setup signals, and usually the digit "0" is sent to the TV-set 64 of FIG. 3, for example.

Soon thereafter the user is likely to submit a second key-press entry HBA. Similar to the first entry in action, this second user entry initiates a sending of a second digit HDA where it urges HB–HD into a sending of the user's first entry as a signal HDA to the VCR 58 of FIG. 3 as a second of usually two incoming program channel selection entry values. Immediately following the signal HDA submission as shown by line HD–HE the second of usually two interlink setup signals, and usually the digit "3" or "4" is sent to the TV-set 64 of FIG. 3, for example.

Figure 14:
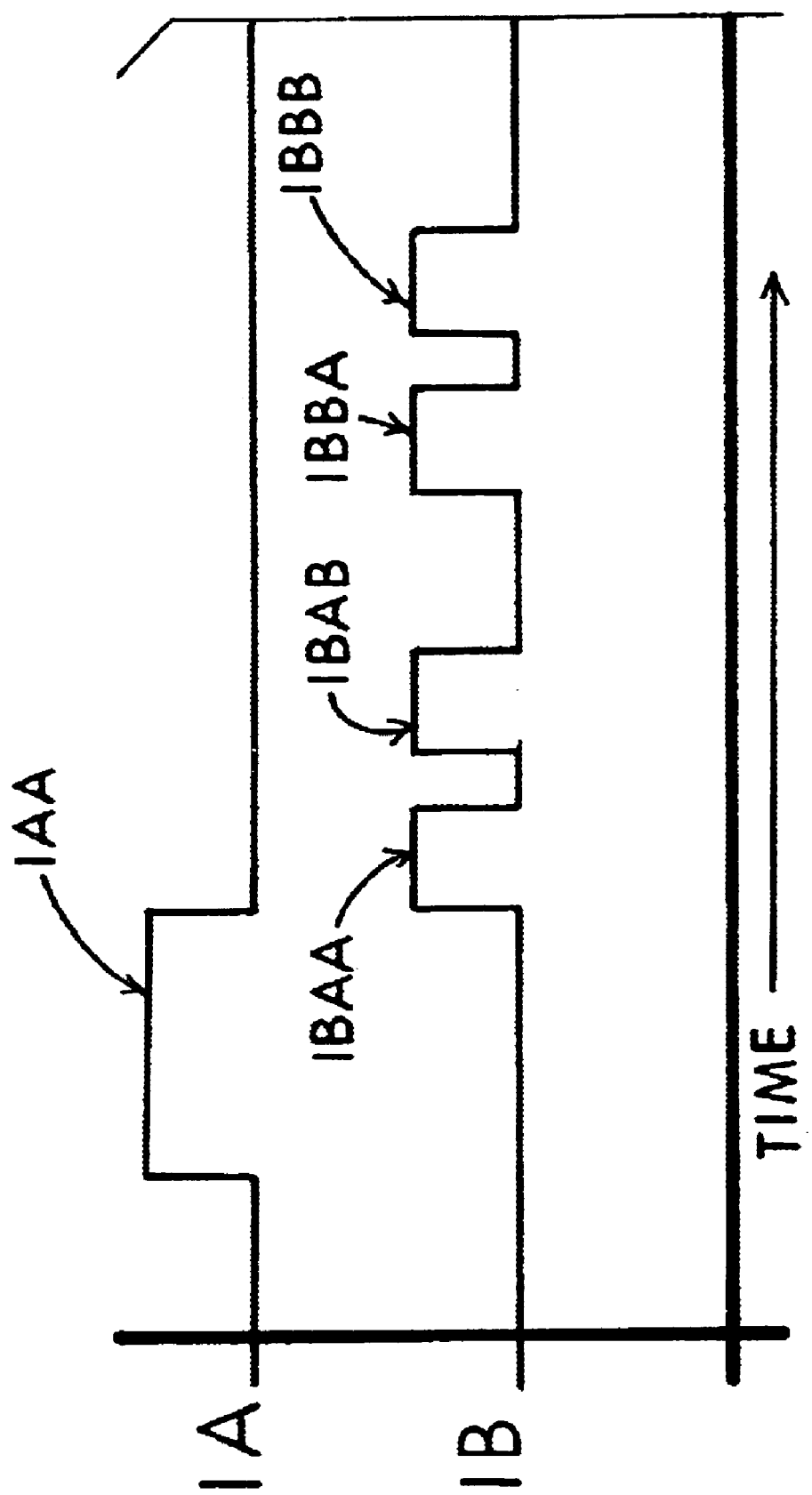
FIG. 14 shows "PLAY" button on VCR activation sends a concurrent series of user preference signal and preset signal.

Looking now at FIG. 14 you will see an occasion where another keybutton, such as the PLAY keybutton associated with a VCR is depressed by the user. When the PLAY or similar function keybutton is pressed, it initiates a command (e.g., the PLAY command in this example) to sends a signal IAA to instruct a VCR to "play". A concurrent signal sequence IBAA–IBAB is similarly sent to set, or reaffirm the setting of, the TV-set input to match the interlink signal and usually channel 3 or channel 4. Another command signal sequence IBBA–IBBB may be used to control another parameter of the remote apparatus, such as muting the TV-set sound to avoid a loud cacophony when the VCR starts to play.

Figure 15:
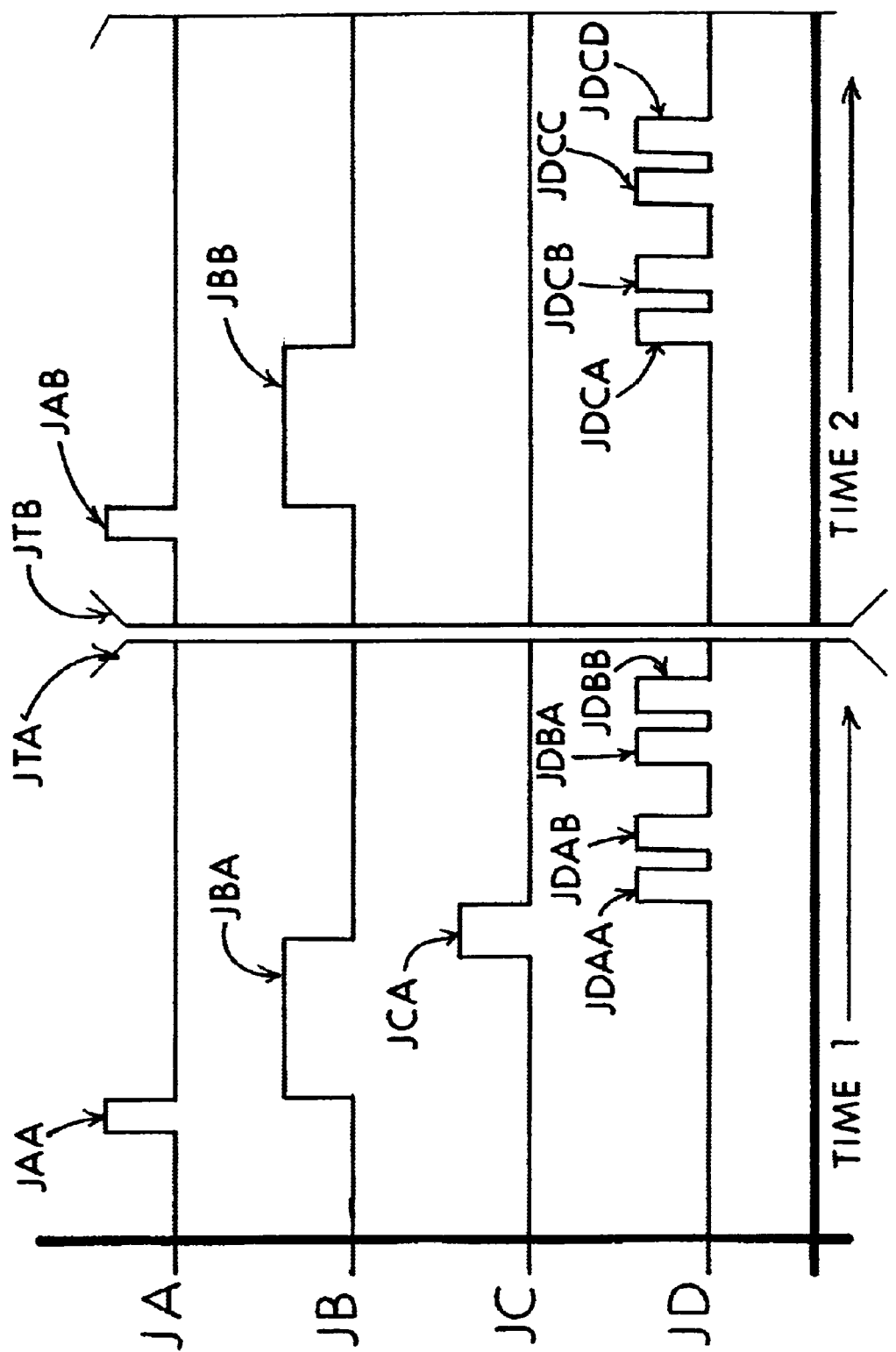
FIG. 15 Graphical showing of user entry timing sequence.

In FIG. 15 the lines JA–JD inclusive depict two sequences of events. In the Time-1 sequence a mixed number representing the user's channel selection preference is submitted by the user. On line JA, the user enters a first digit JAA. A timing interval JBA initiates and if a second digit JCA is submitted by the user prior to timeout of the timing interval, a resulting sequence JDAB–JDAA is developed representing the first entry and the second entry, respectively. The user entry usually sets the desired channel selection on the remotely controlled apparatus. Concurrently, a preset two digit sequence JDBB–JDBA sends to set the interlink signal receptor, usually to one of channel 03 or 04.

In the Time-2 sequence, the user inputs a single integer JAB to represent a preferred channel selection between 1 and 9. The timing interval JBB initiates and if no second entry is submitted on line JC, the first digit of the mixed number is presumed to be a cipher (i.e., a zero) and sent JDCB prefixing the submitted integer JDCA. Similarly a preset two digit sequence JDCD–JDCC sends to set or reset the interlink signal receptor.

Realize that for FIG. 15 the order of the sent signal pairs JDAA–JDAB and JDBA–JDBB may be reversed in their time order, as may the order of the signal sets JDCA–JDCB and JDCC–JDCD.

Figure 16:
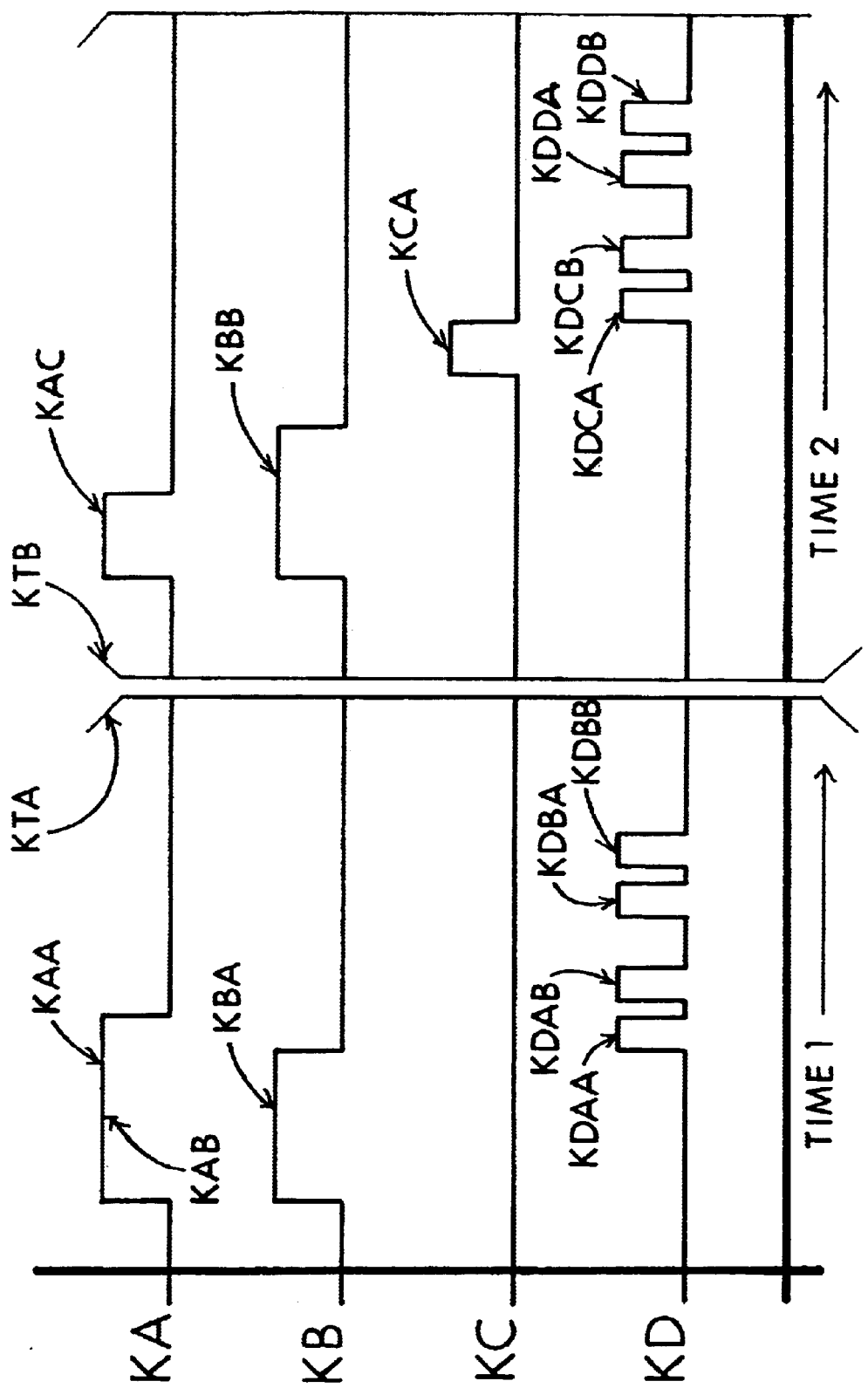
FIG. 16 Graphical showing that a maintained user entry serves to trigger sending of integer preceded by a cipher.

FIG. 16 depicts an integer value user keypress entry KAA which may be maintained for a substantial period of time exceeding a timing interval KRA. The timing interval commences coincident with the onset of the keypress entry KAA as shown in the Time-1 sequence. If the keypress is maintained KAA for a period longer than usual KAB and exceeding the timing interval KRA the entry is "assumed" to be a single digit channel selection. As a result, a cipher is prefixed to the inter value of the key entry KAA defining the sending sequence KDAB as the cipher and KDAA as the integer values. I also show the sending of the preset command signals KDBA–KDBB.

Alternatively, in the Time-2 sequence of FIG. 16 I show the user defined entry KAC and usually an integer to be shorter in duration than the time period KBB. Subsequently the user enters a second defined entry KCA upon which a sending of the user preference first digit KDCB value and second digit KDCA value is sent. I further show the sending of the preset command signals KDDA–EDDB.

Realize that for FIG. 16 the order of the sent signal pairs KDAA–KDAB and KDBA–KDBB may be reversed in their time order, as may the order of the signal sets KDCA–KDCB and KDCC–KDCD.

Figure 17:
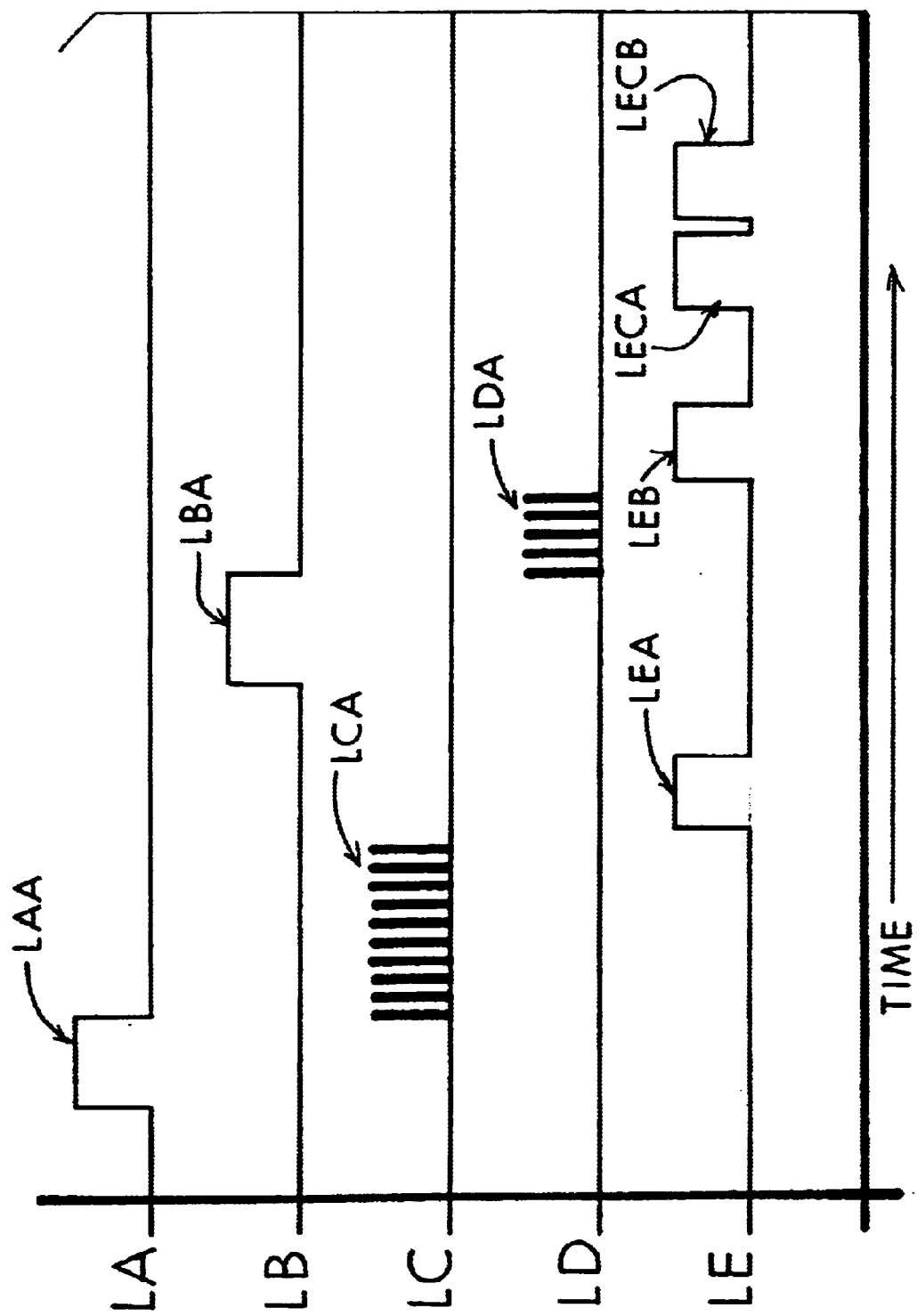
FIG. 17 Depiction of entering user selections sends a sequence of pulses which reduce and partially increase volume to a moderate level.

In FIG. 17 I show the first user entry digit LAA on line LA followed by a sequence of pulsed signals LCA on line LC. The the line LC signal components send to the TV-set and are encoded to remotely step-wise reduce the audio volume by the number of increments as what there are pulses LCA. In practice of my invention, the encoding and number of pulses are normally set to match the TV-set remote control receptor decoding and having a pulse count more than sufficient to reduce the audio volume to a minimum level. Similarly, the first channel selection digit LEA is sent.

The second user entry digit LBA on line LB is next submitted, followed by a lesser sequence of pulsed signals LDA on line LD. The line LD signal components send to the TV-set and are encoded to remotely step-wise increase the audio volume by the number of increments as what there are pulses LDA. In practice of my invention, the encoding and number of pulses are normally set to match the TV-set remote control receptor decoding and have a pulse count predetermined sufficient to increase the audio volume to a moderate level, but usually less than the volume level prior to reduction. It is the intent of the combination of reducing the volume to a minimum and then increasing the volume part-way back to achieve a comfortable initial listening level without enduring a cacophonous burst of loud sound due to a change in program content. I further show the automatic sending of the interlink affirmation signal components LECA–LEDB and usually a sequence comprising a cipher "0" LECB followed by an integer "3" or "4" as usually representing the interlink channel selection admitted to the remotely controlled apparatus.

Figure 18:
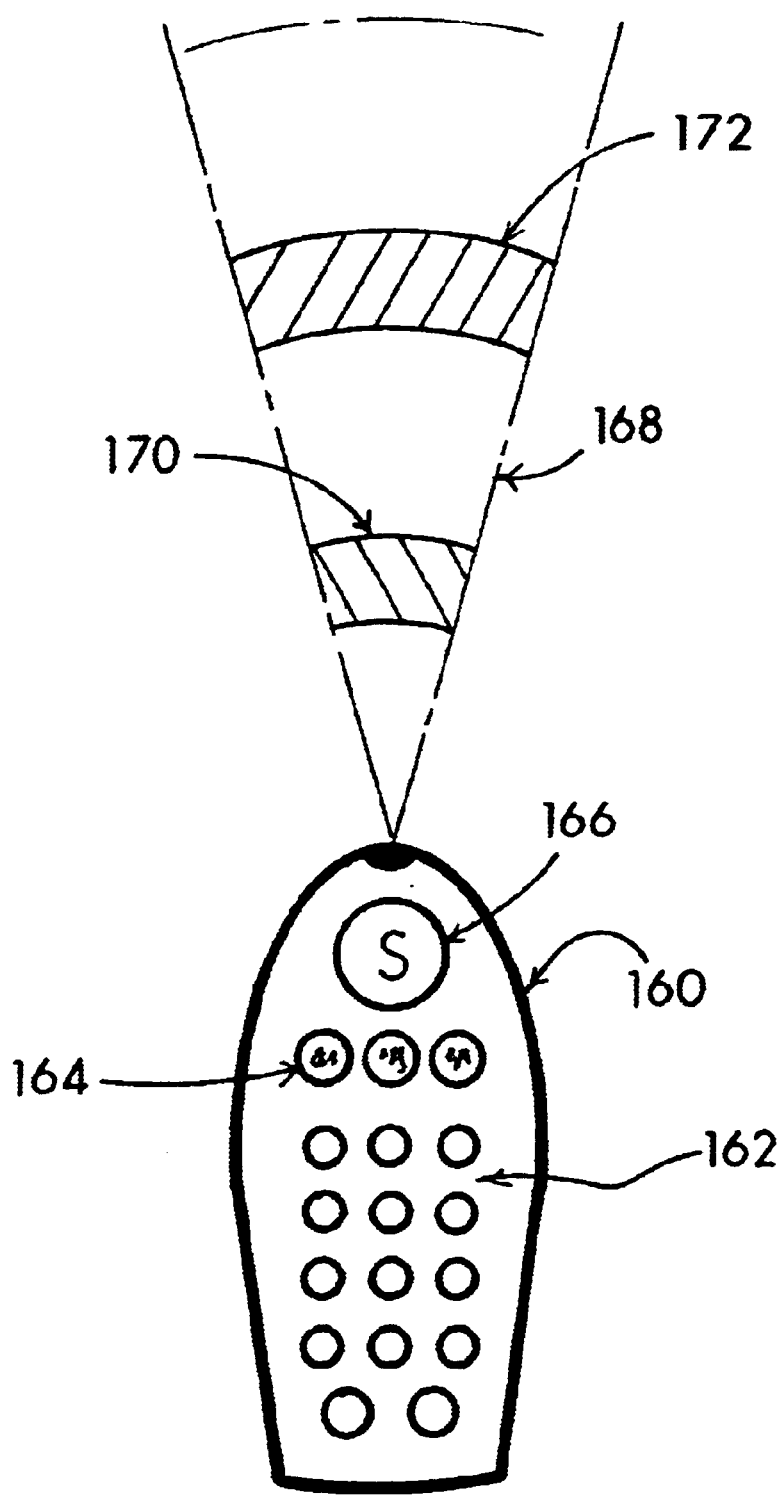
FIG. 18 A remote controller including a singular SEND button for submitting entries some time after their keypad entry.

With FIG. 18 I show an embodiment for a remote controller 160 including a SEND button 166 which can be operated by the user to belatedly send the entries sequentially submitted through the keypad 162. Additional keybuttons 164 allow for controlled device selection. The user typically submits one or more keybutton entries, such as "2" and "8" for channel "28". The entries are temporarily stored in the remote controller until the user aligns the wireless beam signal 168 with the remotely controlled apparatus receptors, whereupon the user presses the SEND button "S" 166. As a result of this later action, the wireless beam is "sent", comprising two components 170 and 172 representing the user preferred selection (and in this example, the channel "28" value) concurrent with the interlink assertion signal (and usually channel "03" or "04").

Figure 19:
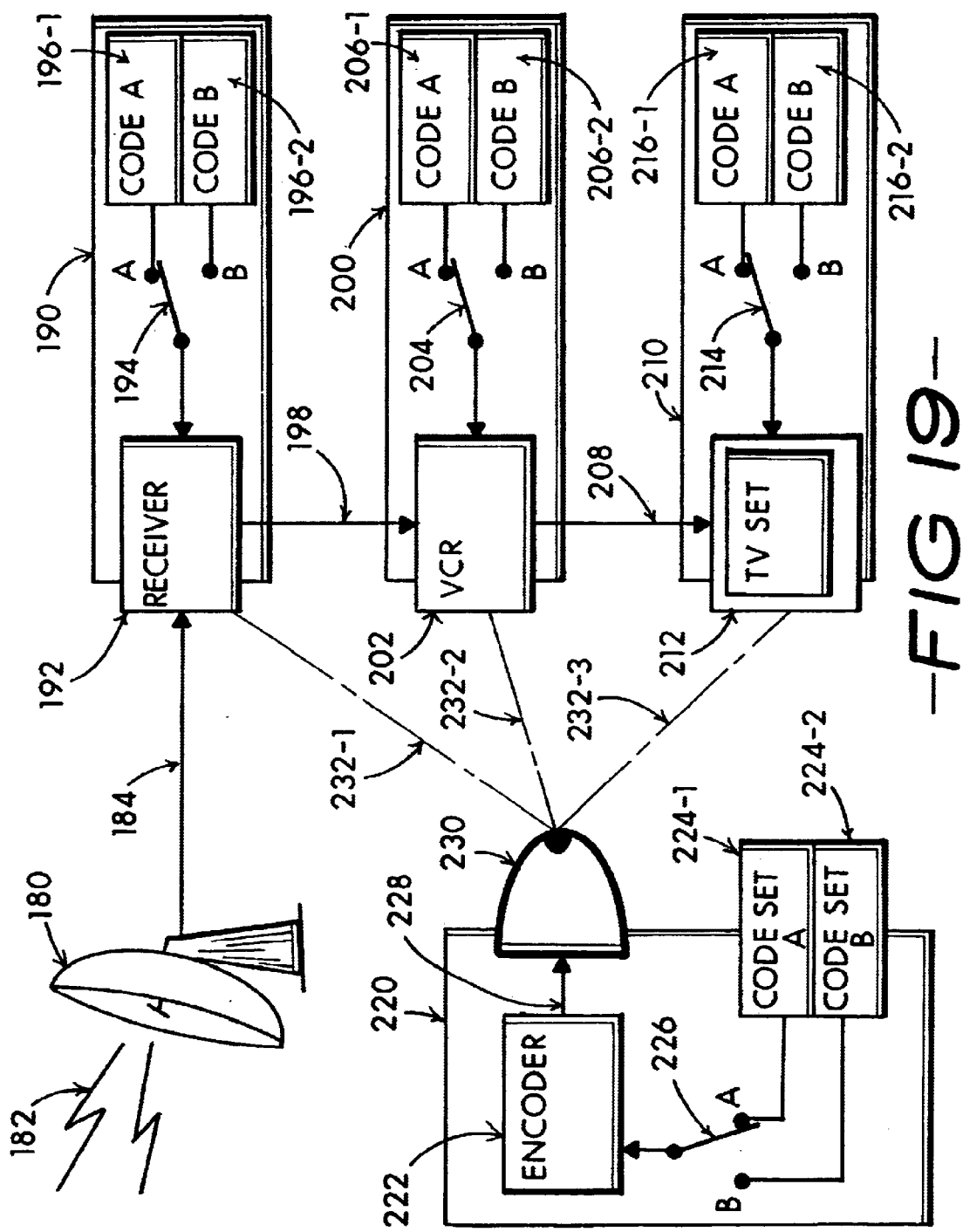
FIG. 19 Showing a remote controller and remotely controlled apparatus having alternate or multiple encoding.

FIG. 19 shows a satellite antenna 180 receiving program signals 182 delivered 184 to the input of a receiver portion 190 of a satellite receiving converter 190.

Looking ahead a bit, I show a portable remote controller 220 which may be used by an operator to send 228 an encoded 222 wireless 230 command signal 232-1 to remotely set the receiver 192 to select different incoming programs arriving over line 184. What I emphasize here is that the remote control decoder portion of the receiving converter 190 and the encoder portion of the remote controller 220 includes two separate code selections 196-1, 196-2 and 224-1, 224-2. Each of these banks of code information may be alternatively selected 194, 226 as a preset.

It is not unusual for the wireless command signals submitted to two different pieces of remotely controlled equipment to interfere with one-another, rendering either or both units inoperable from the remote controller. In particular, when both of the separate units are the "same make" interference may be expected.

With this arrangement, I say that the code is merely changed, albeit as a preset, by the switches 194 and 226. As a result, a non-interfering code may be found and utilized.

Continuing with FIG. 19, I further show that the VCR system 200 including the VCR 202 remote control receptor may include two or more unique code banks 206-1, 206-2 selectable between by a presettable switch 204 and which may overcome interference between controlled apparatus experiencing crosstalk interference between command signals conveyed by the wireless command beam 232-2.

Similarly I go on to show that the TV-set system 210 including the TV-set 212 remote control receptor may include two or more unique code banks 216-1, 216-2 selectable between by a presettable switch 214 and which may overcome interference between controlled apparatus experiencing crosstalk interference between command signals conveyed by the wireless command beam 232-3.

A result of this configuration of FIG. 19 is to enable several similar pieces of remotely controlled equipment capability for operating in the same spatial environment without encountering wireless command signal interference.

The utter essence of my invention is to teach reassertion of the setting of a TV-set to channel 3 or channel 4 when it is coupled with the output of a cable converter box or VCR set to an intermediate, interlinking channel 3 or 4. My basic goal is to overcome the heretofore commonplace error where the TV-set is tuned to the wrong channel and the overall combination of cable converter or VCR and TV-set do not appear to be working properly. My invention is further extendible to include use with other combinations of equipment and for example the interlink coupling of channel 3 signals which might be established between a cable converter output and a VCR input. In this setting, my invention reaffirms the VCR tuner setting to channel 3 every time the cable box program selection is changed, say from channel 17 to channel 64 or whatever.

It is the goal for my invention to automatically and transparently reassert "fixed" channel selection at the input of a TV-set, every time a user selected channel selection command is sent to change the program input of a cable box or VCR connected with the TV-set.

Another non-trivial goal is to reduce or limit the audio volume level delivered by the TV-set every time the incoming program selection is changed, to prevent the annoyance of an unexpected cacophonous blasting of sound as a result of program content change. What I teach is the containment of the sound to a reasonable level through signals developed by the remote controller, independent from the TV-set therefore making the invention's essence compatible with virtually any contemporary TV-set.

I proceed to give illustrative examples of methods and design approaches particularly suitable for practice of the invention in conjunction with various operating situations including usage with a TV-set, VCR, DVD, cable converter, satellite receiver, down-converters, delayed replayers and the like.

While I primarily show my invention's usage in conjunction with entertainment equipment, it is known to show similar applicability of purpose when used with home control systems exemplified by X-10™ technology, Leviton's Decora Home Controls™, and similar systems.

It is necessary to realize that the numerous approaches which I now describe as illustrative are intended to generally explain interactive utilization with a wide variety of remotely controlled systems and particularly entertainment systems. In particular, the intercoupling of TV-sets, VCR's, cable converter boxes and satellite receivers find advantage to my invention's capacity to change the setting of one device in accord with an user's wishes while automatically reaffirming necessitous settings for other devices, all by remote control and independent from the make or model of the various pieces of remotely controllable equipment. I realize that it is obvious for my described approaches to be embodied to take other modified forms which can be engineered to best satisfy a particular application's configuration or take advantage of different technological parts, operational protocols or wireless techniques without departing from the underlying spirit of my invention. In particular it is well known that the rapid state of art advancement may introduce other remote control protocols or standards which can be merely adapted to my invention's fundamental teachings without departing from the overall essence of my invention. I anticipate this sort of implementation variation wrought by contemporaneous technology advancement and refinement to be obvious improvement and merely the result of good engineering practices.

I claim for my invention:

1. A remote control method enabling a portable remote controller to establish a concurrent submission of a user selected command to a first remote apparatus and a preset command to a second remote apparatus and therefore comprising:

manually entering the user selected command into a portable remote controller;

sending a wireless signal concurrently encoded with the user selected command and the preset command;

interlinking an intercoupling signal between the first remote apparatus and the second remote apparatus;

receiving the wireless signal by the remote apparatus;

first utilizing the user selected command to establish a first setting of the first remote apparatus;

second utilizing the preset command to establish a necessitous setting of the second remote apparatus to effectuate the interlinking of the intercoupling signal;

whereby, the user selected command signal submitted to the first remote apparatus is ordinarily accompanied by the preset command signal to automatically establish an affirmation that the second remote apparatus is necessarily set to accept the intercoupling signal.

2. The remote control method of claim 1 comprising further steps of:

storing a pluralistic library of unique code pattern selections;

first encoding the user selected command with a first unique code pattern selection;

second encoding the preset command with a second distinctively unique code pattern selection;

finding a command interference in at least one of the first encoding and the second encoding pattern utilized by wireless commands issued by the portable remote controller relative with at least one of the first remote apparatus and the second remote apparatus; and, redetermining a change of at least one of the unique code pattern selections to at least minimize the command interference.

3. The remote control method of claim 1 comprising further steps of:

first submitting at least one keybutton entry as the user selected command representing a channel selection value;

temporarily storing the first submitted channel selection value;

manually entering a SEND command subsequent to having first submitted the channel selection value; and, initiating the sending of the wireless signal said concurrently encoded with the temporarily stored channel selection value and the preset command in an immediate response to the manually entered SEND command;

wherein, the sending of the wireless signal is deferred until at least one channel selection value is entered and temporarily stored by the user and the SEND command is manually initiated by the user.

4. The remote control method of claim 1 comprising further steps of:

first submitting the user selection command as a single digit channel selection value;

temporarily storing the first submitted channel selection value;

manually submitting a SEND command as a functionally separate manual entry;

perfecting the user selection command by automatically prefixing the single digit channel selection value with a cipher; and, sending the wireless signal concurrently encoded with the perfected said user selection command and the preset command in an immediate response to the manually submitted SEND command;

wherein,
the sending of the first wireless signal is preferably deferred until the SEND command is manually submitted and the user selection command is perfected.

5. The remote control method of claim 1 comprising further steps of:
manually entering the user selection command as a non-cipher single digit channel selection value;
prolonging duration of the manual entry;
automatically executing a SEND command when the prolonged duration exceeds a predetermined period of time;
perfecting the user selection command by automatically prefixing the non-cipher command digit value with a cipher; and,
sending the wireless signal concurrently encoded with the perfected said user selection command and the preset command in an immediate response to the automatic execution of the SEND command.

6. The remote control method of claim 1 comprising further steps of:
the first remote apparatus to comprise one of a video tape recorder (VCR), a digital video disk player, a cable-TV signal converter, a satellite-TV receiver and a delayed re-player;
the second remote apparatus to include a primary television receiving apparatus intercoupled with the first remote apparatus;
establishing a flow of an intercoupling signal through the interlink usually maintained between the first remote apparatus and the second remote apparatus;
presetting the first remote apparatus to deliver the intercoupling signal in a necessitous band of frequencies and usually established as one of television channel 3 and channel 4;
submitting the user selected command into the portable remote controller as a user preferred channel selection usually determined as one of a number of available program channel selections;
setting a tuner portion of the first remote apparatus to correspond with the user preferred channel selection; and,
asserting the preset command to automatically affirm that a setting of a tuner portion of the second remote apparatus corresponds with the intercoupling signal and usually one of the television channel 3 and channel 4.

7. The remote control method of claim 1 comprising further steps of:
delaying the sending of the wireless signal;
the manual entering of a manual AFFIRM command by the user;
modifying encoding of the wireless signal to exclude the user selected command;
said sending the wireless signal singularly encoded with the preset command; and,
said second utilizing the preset command to presently reaffirm the necessitous setting of the second remote apparatus in absence of committing the sending of the user selected command to the first remote apparatus.

8. The remote controller method of claim 1 comprising further steps of:
defining the second remote apparatus as a televisor;
recognizing the user selected command as a preferred channel selection usually singled out as one of several available program channels;
extending the user selected command portion of the wireless signal to include an audio volume level command;
extending the receiving of the user selected command to include a remotely controllable audio volume control responsive to the audio volume level command;
remotely setting a user preferred level of first audio volume level developed by the televisor; and,
automatically lowering the user preferred level of audio volume level to a substantially reduced second audio volume level concurrent with the sending of the wireless signal;
wherein,
a change in channel selection automatically reduces the audio volume level.

9. The remote controller method of claim 1 comprising further steps of:
defining an auxiliary command representing an auxiliary function state;
the sending of the wireless signal said concurrently encoded with the user selected command and the preset command and further encoded with the auxiliary command; and,
said receiving the wireless signal and decoding the auxiliary command to assert the auxiliary function state;
whereby,
a reassertion of the auxiliary function state automatically occurs whenever the wireless signal is sent.

10. The remote controller method of claim 1 comprising further steps of:
said manually entering the user command;
maintaining manual activation of a terminative entry step of a manual entry event for an indefinite period of time;
releasing the maintained manual activation subsequent to an elapse of a user determined period of time and usually exceeding one second duration;
automatically executing a SEND command in response to the detected release of the maintained manual activation subsequent to the elapse of the user determined period of time; and,
initiating the sending of the wireless signal said concurrently encoded with the preferred channel selection value and the preset command in an immediate response to the automatically executed SEND command;
whereby,
the sending of the wireless signal is deferred until the release of the terminative entry step of the manual entry.

11. A remote control method including a portable remote controller operable by a user to submit an encoded wireless command signal to a remotely controlled apparatus and comprising steps of:
establishing the remotely controlled apparatus to first include a program signal tuning device having a first input port selectable between a plurality of television program signals and to output an intercoupling channel signal;
further establishing the remotely controlled apparatus to second include a televisor having a second input port which may be necessitously set to receive the intercoupling channel signal;
manually entering a user preferred program channel selection value into the portable remote controller;

sending a wireless command signal between the portable remote controller to be intercepted by the remotely controlled apparatus;

concurrently modulating the wireless command signal with the user preferred channel selection value for the program signal tuning device and the necessitous channel setting for the setting of the televisor to receive the intercoupling channel signal;

first intercepting the user preferred program channel selection value portion of the wireless command signal and therefrom setting the first input port selection of the program signal tuning device to the user preferred channel; and, second intercepting the necessitous channel setting portion of the wireless command signal and therefrom automatically ascertain that the second input port of the televisor is necessitously set to receive the intercoupling channel signal.

12. The remote control method of claim 11 comprising steps of:

configuring the program signal tuning device to include one of at least a cable box, satellite receiver and video recorder embodying a tunable receiver for selecting between the incoming television program signals;

utilizing the program signal tuning device to adapt the user preferred channel selection signals into the intercoupling channel signal;

intercoupling the intercoupling channel signal with the second input of the televisor;

utilizing the user preferred channel selection value portion of the wireless command signal to establish the preferred program channel selection as an immediate setting for the first input of the program signal tuning device; and, utilizing the necessitous channel setting portion of the wireless command signal to affirm that the televisor is maintained set to receive the intercoupling channel signal.

13. The remote control method of claim 11 comprising further steps of:

coupling a first input port of the program signal tuning device with a source of at least two separate television program signals;

adapting a selected one of the television program signals into the intercoupling channel signal;

interlinking the intercoupling channel signal with the second input port of the televisor;

utilizing the sending of the user preferred channel selection value to effect the user selection for one of the at least two separate television program channel signals; and, utilizing a concurrent sending of the necessitous channel setting to automatically at least one of affirm and set the necessitous channel setting of the second input port of the televisor.

14. The remote control method of claim 13 comprising further steps of:

configuring the televisor to include an audio reproduction portion;

adjusting the audio reproduction for a present level of user preferred audio volume;

extending the concurrent modulation of the wireless command signal to include a volume reduction command at least concurrent with the modulation of the wireless command signal with the user preferred channel selection value; and, third intercepting the volume reduction command signal portion of the first wireless command signal and effect an at least partial reduction of the audio volume level usually to a predetermined intermediate level between mute and the user preferred audio volume level;

whereby,
whenever the televisor channel is changed the audio volume is partially quieted to a lower level.

15. The remote control method of claim 11 comprising steps of:

configuring the televisor apparatus to include an audio reproduction portion;

setting a volume level for the audio reproduction portion to a user preferred volume level through a remotely controlled volume adjustor;

coupling the with the television program signals;

utilizing the user preferred program channel selection value to particularly effectuate an immediate selection for one of the television program signals and to concurrently effectuate an automatic change of the user preferred volume level to a reduced volume level;

whereby,
every time a change occurs between the user preferred channel selections the user preferred volume level is automatically lowered to the reduced volume level.

16. The remote control method of claim 15 wherein the remotely controlled volume adjustor enables an incremental adjustment of the volume level in discrete volume steps and comprising further steps of:

incrementally adjusting the volume level in a plurality of discrete volume steps;

obtaining the effectuating of the reduced volume level concurrent with the sending of the user preferred channel selection value by extending the wireless command signal to include sending a succession of audio level setting pulse signal sequences-wherein each component volume setting pulse comprises a portion of an audio volume level command function;

first delivering a first predetermined number of volume setting down-step pulses sufficient to reduce the audio volume to a minimum level; and, immediately succeeding the volume setting down-step pulses with a second predetermined number of volume setting up-step pulses sufficient in number to urge an increase of volume level to the reduced volume level as usually determined intermediate between the preferred volume level and the minimum level.

17. The remote control method of claim 11 comprising further steps of:

embodying the portable remote controller with a keypad inclusive of a plurality of manual entry keybuttons;

extending the keypad to include a uniquely designated SEND function keybutton;

admitting the manual entry of the user preferred program selection value usually as a plurality of individually weighted keybutton actions;

temporarily storing data representing the individual weight of each of the keybutton actions;

manually actuating the SEND function keybutton at a time subsequent to a terminal one of the individually weighted keybutton actions;

reading out the temporarily stored data;

applying the temporarily stored data to effectuate the user preferred channel selection value portion of the wireless command signal;

whereby, the user may complete the entry of a number of the individually weighted keybutton actions precedent to the manual actuation of the SEND function keybutton to urge the sending of the wireless command signal.

18. The remote control method of claim 11 comprising further steps of:

embodying the portable remote controller with a keypad inclusive of a plurality of manual entry keybuttons;

admitting the manual entry of the user preferred program selection value usually as a plurality of individually weighted keybutton actions;

temporarily storing data representing the individual weight of each of the keybutton actions;

actuating and maintaining the actuation of a terminal one of the keybutton actions;

aligning coupling for the wireless command signal traversal between the portable remote controller and the remotely controlled apparatus;

releasing the maintained actuation of the terminal one of the keybutton actions thereupon developing a SEND command;

reading out the temporarily stored data;

applying the temporarily stored data to effectuate the user preferred channel selection value portion of the wireless command signal while urging the sending of the wireless command signal;

whereby, the user may complete the entry of a number of the individually weighted keybutton actions precedent to the sending of the wireless command signal by maintaining actuation of the terminal entry keybutton until the sending is considered timely.

19. The remote control method of claim 11 comprising further steps of:

embodying the portable remote controller with a keypad inclusive of a plurality of manual entry keybuttons;

admitting the manual entry of the user preferred program selection value usually as a plurality of individually weighted keybutton actions;

temporarily storing data representing the individual weight of each of the keybutton actions;

initiating a timing function of predetermined duration in response to onset of and concurrent with the assertion of the manual entry;

aligning coupling for the wireless command signal traversal between the portable remote controller and the remotely controlled apparatus;

developing a SEND command upon elapse of the predetermined duration of the timing function;

reading out the temporarily stored data in response to the SEND command;

applying the temporarily stored data to effectuate the user preferred channel selection value portion of the wireless command signal while the SEND command urges the sending of the wireless command signal;

whereby, the user may complete the entry of a number of the individually weighted keybutton actions precedent to a time delayed sending of the wireless command signal and align a coupling path between the remote controller and the remotely controlled apparatus.

20. The remote control method of claim 11 comprising further steps of:

embodying the portable remote controller with a keypad inclusive of a plurality of manual entry keybuttons;

admitting the manual entry of an single integer digit representing the user preferred program selection value usually as an individually weighted keybutton action;

maintaining assertion of the manual entry for a prolonged period of time;

initiating a timing function of predetermined duration in response to onset of and ordinarily concurrent with the assertion of the manual entry of the single integer digit;

aligning coupling for the wireless command signal traversal between the portable remote controller and the remotely controlled apparatus;

developing a SEND command upon elapse of the predetermined duration of the timing function;

perfecting the single integer digit as a preferred channel selection value by prefixing the single integer digit with a cipher in immediate response to the developed SEND command;

applying the perfected, cipher prefixed single integer digit as the user preferred channel selection value portion of the wireless command signal while the SEND command urges the sending of the wireless command signal;

whereby, the user may merely enter a single digit channel selection as an single integer number and automatically prefixed with a leading cipher prior to sending to the remotely controlled apparatus as a channel selection value.

21. The remote control method of claim 11 comprising further steps of:

embodying the portable remote controller with a keypad inclusive of a plurality of manual entry keybuttons;

admitting the manual entry of an single integer digit representing the user preferred program selection value usually as an individually weighted keybutton action;

aligning coupling for the wireless command signal traversal between the portable remote controller and the remotely controlled apparatus;

manually actuating a uniquely designated keybutton to manually issue a SEND command;

perfecting the single integer digit as the preferred channel selection value by prefixing the single integer digit with a cipher in immediate response to the manually issued SEND command;

applying the perfected, cipher prefixed single integer digit as the user preferred channel selection value portion of the wireless command signal while the SEND command urges the sending of the wireless command signal;

whereby, the user may merely enter a single digit channel selection as an single integer number and actuate the SEND command whereupon the single integer number is automatically prefixed with a leading cipher prior to sending to the remotely controlled apparatus as a channel selection value.

22. A remote control method including a portable remote controller operable by a user to submit a command encoded wireless control signal to a remotely controlled televisor system and comprising steps of:

configuring the televisor system to include:
- a source of television program signals;
- an adaptive device comprising at least one of a cable signal converter, a video cassette recorder, a satellite signal receiver and a delayed replayer;
- a television set; and,
- interlinking the adaptive device and the television set;

manually entering a user preferred channel selection value into the portable remote controller;

predetermining a necessitous command signal;

sending the wireless control signal concurrently modulated with the preferred channel selection value and the necessitous command signal;

remotely receiving the wireless control signal;

first recovering the preferred channel selection value;

second recovering the necessitous command signal;

urging the adaptive device to select one of a plurality of incoming program signals corresponding with the recovered said preferred channel selection value;

converting the selected said incoming program signal into an interlink signal;

enabling the recovered said necessitous command signal to assert a tuning of the television set to a predetermined channel receptive of the interlink signal therefrom process the interlink signal into an interpretable video signal; and, establishing that every time the user selected command state value is first intercepted it may effect a change in a primary television channel signal selection and the preset command state value is concurrently second intercepted to reassert and automatically affirm a necessitous setting for the second signal input portion of the televisor apparatus.

\* \* \* \* \*